(12) United States Patent
Steinbach et al.

(10) Patent No.: US 7,894,922 B2
(45) Date of Patent: Feb. 22, 2011

(54) STRUCTURAL TRANSFORMATION OF EXECUTION-LEVEL MANUFACTURING PROCESS ROUTINGS INTO PLANNING-LEVEL ROUTINGS

(75) Inventors: Jochen Steinbach, Bad Schoenborn (DE); Jaakob Kind, Heidelberg (DE)

(73) Assignee: SAP AG, Walldorf ( * ) Notice: Subject to any disclaimer, the term of this patent is extended or adjusted under 35 U.S.C. 154(b) by 426 days.

(21) Appl. No.: 11/614,856

(22) Filed: Dec. 21, 2006

(65) Prior Publication Data

US 2008/0154412 A1      Jun. 26, 2008

(51) Int. Cl.
G06F 19/00  (2006.01)
G06F 9/44   (2006.01)
G06F 9/46   (2006.01)

(52) U.S. Cl. ............. 700/97; 705/7; 705/8; 700/95; 700/99; 700/100; 700/105; 700/107; 700/174

(58) Field of Classification Search .......... 700/97, 700/99, 100, 107, 105, 95, 174; 705/7, 8
See application file for complete search history.

(56) References Cited

U.S. PATENT DOCUMENTS

| | | | |
|---|---|---|---|
| 5,231,567 A | 7/1993 | Matoba et al. | |
| 5,251,122 A * | 10/1993 | Sakamoto et al. ............ | 700/18 |
| 5,303,144 A | 4/1994 | Kawashima et al. | |
| 5,369,570 A * | 11/1994 | Parad ........................... | 705/8 |
| 5,442,561 A | 8/1995 | Yoshizawz et al. | |
| 5,442,730 A | 8/1995 | Bigus | |
| 5,764,543 A | 6/1998 | Kennedy | |
| 5,787,000 A | 7/1998 | Lilly et al. | |
| 5,870,696 A | 2/1999 | Randolph | |
| 5,966,694 A | 10/1999 | Rothschild et al. | |
| 5,970,086 A | 10/1999 | Kanematsu et al. | |
| 6,233,538 B1 | 5/2001 | Gupta et al. | |
| 6,249,715 B1 | 6/2001 | Yuri et al. | |
| 6,259,959 B1 | 7/2001 | Martin | |
| 6,345,256 B1 | 2/2002 | Milsted et al. | |
| 6,345,259 B1 | 2/2002 | Sandoval | |
| 6,360,188 B1 | 3/2002 | Freidman et al. | |
| 6,434,440 B1 * | 8/2002 | Teranishi et al. ............ | 700/97 |
| 6,496,747 B1 | 12/2002 | Suzuki | |

(Continued)

OTHER PUBLICATIONS

Almeida et al., "A Workload Data Aggregation Process for Flexible Manufacturing System Modeling using Queueing Network Models" 2001 International Journal to Flexible Manufacturing Systems p. 309-350.*

(Continued)

*Primary Examiner*—Albert Decady
*Assistant Examiner*—Thomas H Stevens
(74) *Attorney, Agent, or Firm*—Fish & Richardson P.C.

(57) ABSTRACT

Computer-implemented methods, and associated computer program products and systems, are disclosed for generating electronic data for use in planning the execution of a manufacturing process. The methods, generally, are used in the structural transformation of execution-level routings for manufacturing processes into planning-level routings. The methods applies various transformation techniques when a planning-level routing includes alternative paths, and different transformation techniques when a planning-level routing includes parallel paths. Planning modes are created in the case of alternative paths, and parallel paths generally do not cause multiple modes to be created. Parallel and alternative paths in a planning-level operation also has impacts on how the a planned duration formula is determined.

10 Claims, 26 Drawing Sheets

U.S. PATENT DOCUMENTS

| | | |
|---|---|---|
| 6,546,300 B1 | 4/2003 | Fukuda et al. |
| 6,564,113 B1 * | 5/2003 | Barto et al. .................. 700/99 |
| 6,606,527 B2 | 8/2003 | de Andrade et al. |
| 6,662,066 B1 | 12/2003 | Yu et al. |
| 6,668,208 B2 | 12/2003 | Baumbusch et al. |
| 6,701,201 B2 * | 3/2004 | Hegde et al. ................ 700/107 |
| 6,738,686 B2 | 5/2004 | Caretta et al. |
| 6,801,820 B1 * | 10/2004 | Lilly et al. .................. 700/100 |
| 6,839,601 B1 | 1/2005 | Yazback et al. |
| 6,873,878 B2 | 3/2005 | Liu et al. |
| 6,898,472 B2 | 5/2005 | Crampton et al. |
| 6,947,951 B1 | 9/2005 | Gill |
| 7,031,893 B2 | 4/2006 | Gupta et al. |
| 7,054,703 B2 | 5/2006 | Wu et al. |
| 7,058,587 B1 | 6/2006 | Horne |
| 7,139,719 B1 | 11/2006 | Cherneff et al. |
| 7,162,318 B1 | 1/2007 | Brearley et al. |
| 7,328,078 B2 | 2/2008 | Sanford et al. |
| 7,363,324 B2 | 4/2008 | Aboulnaga et al. |
| 7,376,548 B2 | 5/2008 | Sinclair |
| 7,412,295 B2 * | 8/2008 | Rothenburg .................. 700/97 |
| 7,489,982 B2 | 2/2009 | Liu et al. |
| 7,496,860 B2 * | 2/2009 | Saxena et al. ............... 715/853 |
| 7,519,444 B2 * | 4/2009 | Lilly et al. .................. 700/100 |
| 2002/0173867 A1 * | 11/2002 | Duncan et al. ............... 700/97 |
| 2003/0014314 A1 | 1/2003 | Griep et al. |
| 2003/0050817 A1 | 3/2003 | Cargille et al. |
| 2003/0065415 A1 * | 4/2003 | Hegde et al. ................ 700/100 |
| 2004/0193502 A1 | 9/2004 | Heitner et al. |
| 2006/0106473 A1 | 5/2006 | Enright et al. |
| 2006/0155412 A1 | 7/2006 | Ikeda |
| 2007/0162491 A1 | 7/2007 | Schmitz et al. |
| 2007/0219929 A1 * | 9/2007 | Steinbach .................... 705/80 |
| 2008/0103715 A1 | 5/2008 | Tsuda et al. |
| 2008/0140356 A1 | 6/2008 | Sanford et al. |
| 2009/0039024 A1 | 2/2009 | Jenkins et al. |

OTHER PUBLICATIONS

Materials printed from www.wassermann.de website regarding Wassermann Supply Chain Software (5 pages), printed Mar. 10, 2006, p. 1-5.

Shaw C. Feng, Manufacturing Planning and Execution Software Interfaces, 2000, Journal of Manufacturing System, vol. 19/No.1, p. 1-17.

* cited by examiner

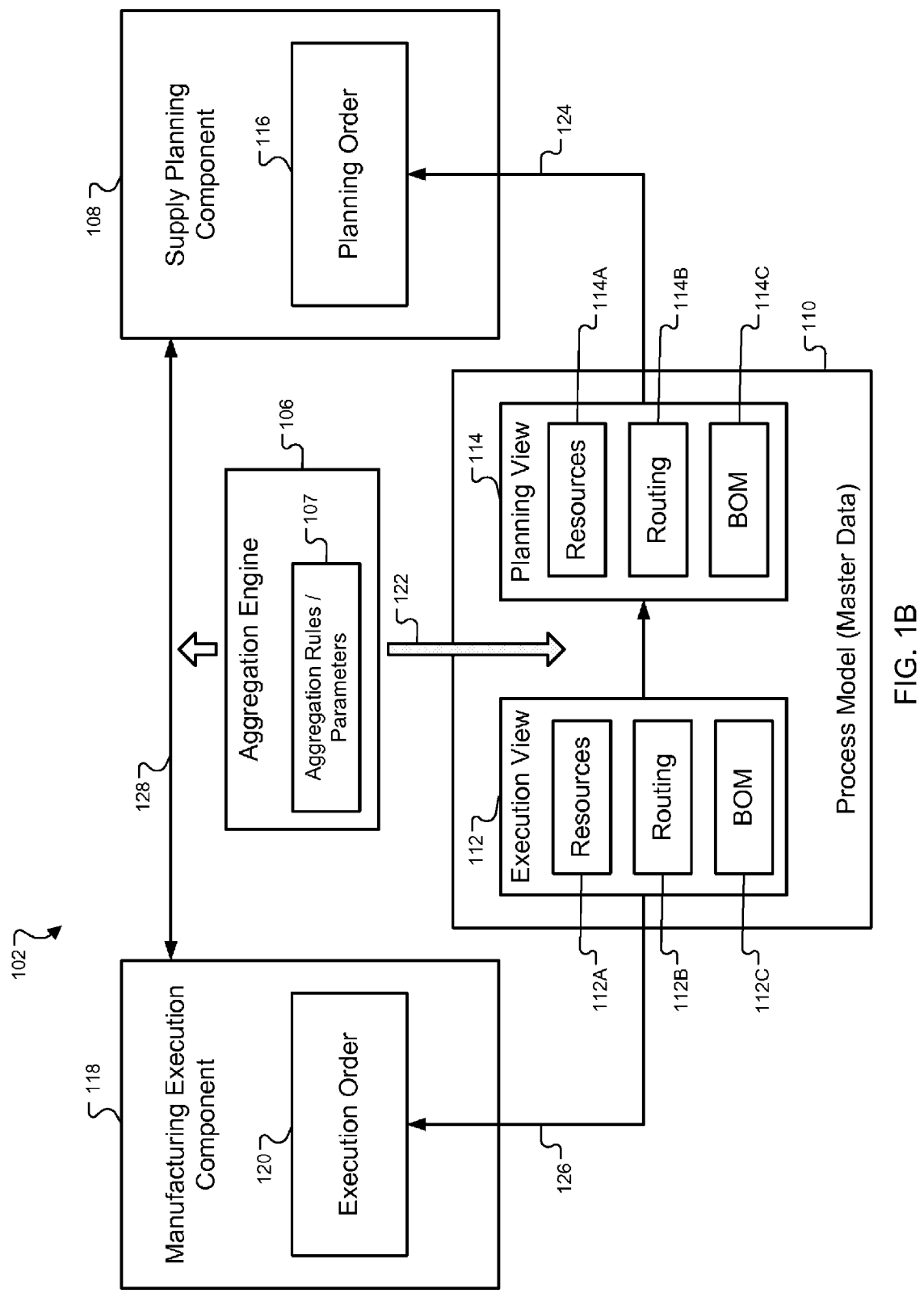

STRUCTURAL TRANSFORMATION OF EXECUTION-LEVEL MANUFACTURING PROCESS ROUTINGS INTO PLANNING-LEVEL ROUTINGS

TECHNICAL FIELD

This document relates to manufacturing planning and execution computing systems.

BACKGROUND

A manufacturing planning and execution computing system may be used in a manufacturing environment that produces products according to a demand for those products. Such a system is able to control and track the operation of the manufacturing process, and uses predefined manufacturing process master data that typically is made up of many defined execution operations. Each of the separate execution operation definitions may include, for example, what the inputs to the operation are, what machinery (or resource) must, or may, be used in the operation, and what the output of the operation is. This predefined master data also typically defines a workflow, or linkage, between each of the individual manufacturing operations. During execution of the system, the system controls and tracks each of the operations in the overall process.

The system may, for example, provide control such as making a selection of one of several similarly functioning machines to be used to perform a particular manufacturing operation. In addition, the system may provide for tracking the process through the use of confirmations, by user entry or automatically by a machine for example, that a particular manufacturing operation has commenced or has been completed, for example.

A maximum or optimum that a manufacturing operation is able to produce given the available resources may be referred to as the overall capacity for the manufacturing operations, individual resources such as human capital and machine tools may each have a maximum or optimum capacity, and a production order may impose a capacity requirement on each of the resources. In addition, a specific resource capacity requirement may be organized in a manufacturing computing system under a defined manufacturing operation during which the resource is used. The manufacturing operations also require the use of materials (e.g., input materials) to create the finished output. As with capacity, a production order may impose various material requirements. A specific material requirement may also be organized in a manufacturing computing system under a defined manufacturing operation during which the material is used.

In an example manufacturing computing system, the system may include a planning tool that plans how a defined demand will be produced. The master data that defines the execution operations of the manufacturing process may be used in the planning process to determine the time it will take to meet the defined demand and the materials and resources needed. In many manufacturing processes, the number of execution operations is very large, and the interrelationships between different execution operations is sometimes very complicated. This makes the planning process a challenge, in that the level of granularity of information provided to a planning user may be too great for the planning user to be able to appreciate higher-level issues to consider in a planning process.

The manufacturing process master data and routing definitions are, in a typical case, defined by a process designer or engineer. The master data and routing definitions typically define each of the operations of the manufacturing process in detail, and how each of the operations relates to other operations. The manufacturing master data and routing definitions are generally defined up front, before the manufacturing process is ever run, and are generally not changed very frequently. In other words, the master data and routing definitions are not intended to be changed on a day-to-day basis, but rather are set up at the beginning to achieve an efficiently operating manufacturing entity.

SUMMARY

Computer-implemented methods, and associated computer program products and systems, are disclosed for generating electronic data for use in planning the execution of a manufacturing process. The methods, generally, are used in the structural transformation of execution-level routings for manufacturing processes into planning-level routings.

In one aspect, a computer-implemented method is disclosed for generating electronic data for use in planning the execution of a manufacturing process. The method includes receiving defined groupings for multiple execution-level manufacturing operations that are defined in a manufacturing process execution-level electronic data model and that define a process flow to produce a product. At least one of the defined groupings includes a process step definition that has multiple different defined alternative steps. The method also includes generating the electronic data for use in planning execution of the manufacturing process using the defined groupings for the multiple execution-level manufacturing operations. The generated electronic data includes, for each grouping that includes a process step definition that has multiple different defined alternative steps, a separate planning mode for the grouping of execution-level operations.

In various implementations, one or more of the following features may be included. The generated electronic data may define planning-level manufacturing operations that each correspond to a different one of the defined groupings of the execution-level operations. In such a case, each planning mode for a planning-level operation may have a corresponding duration calculation formula associated therewith. Also, each of the separate planning modes may include execution-level operations that are common to all planning modes because they are not part of a process flow that includes the process step definition that has the multiple different defined alternative steps, and execution-level operations that are different in each of the planning modes because they are a part of one of the defined alternative steps of the process step definition that has the multiple different defined alternative steps.

In another aspect, a computer-implemented method is disclosed for generating electronic data for use in planning the execution of a manufacturing process. The method includes receiving defined groupings for multiple execution-level manufacturing operations that are defined in a manufacturing process execution-level electronic data model and that define a process flow to produce a product, wherein at least one of the defined groupings includes a process step definition that has multiple different defined parallel steps. The method also includes generating the electronic data for use in planning execution of the manufacturing process using the defined groupings for the multiple execution-level manufacturing operations. The generated electronic data includes, for each grouping that includes a process step definition that has multiple different defined parallel steps, a duration calculation formula for the grouping that has as an input lot size for the product being produced and that produces a duration measure that corresponds to the longest duration for the parallel paths for a particular lot size input.

In various implementations, the method may include one or more of the following features. The generated electronic data may define planning-level manufacturing operations that each correspond to a different one of the defined groupings of the execution-level operations. The duration formula for the grouping with parallel paths is the duration formula for the parallel path that is longer in duration depending on the lot size.

In another aspect, a computer program product is disclosed. The computer program product is tangibly embodied in an information carrier and includes instructions that, when executed, perform operations for generating a planned time duration for a manufacturing process operation defined for planning purposes as described in connection with the methods described above. In yet another aspect, systems are disclosed that are capable of generating a planned time duration for a manufacturing process operation defined for planning purposes as described in connection with the methods described above.

The details of one or more embodiments of the invention are set forth in the accompanying drawings and the description below. Other features, objects, and advantages of the invention will be apparent from the description and drawings and from the claims.

DESCRIPTION OF DRAWINGS

FIGS. 1B-1D are block diagrams of three different perspectives of an example of the manufacturing planning computing module shown in FIG. A, shown in more detail.

Like reference symbols in the various drawings indicate like elements.

DETAILED DESCRIPTION

FIG. 1 shows an exemplary manufacturing or production entity 100 that includes a manufacturing planning and execution computing system 102 and a manufacturing environment 104, which may be, for example, a manufacturing shop floor. The manufacturing entity 100 may be any type of facility or manufacturing plant—or multiple facilities or plants under control of a distributed computing system—that manufactures any type of product and supplies product to customers.

Figure 1A:
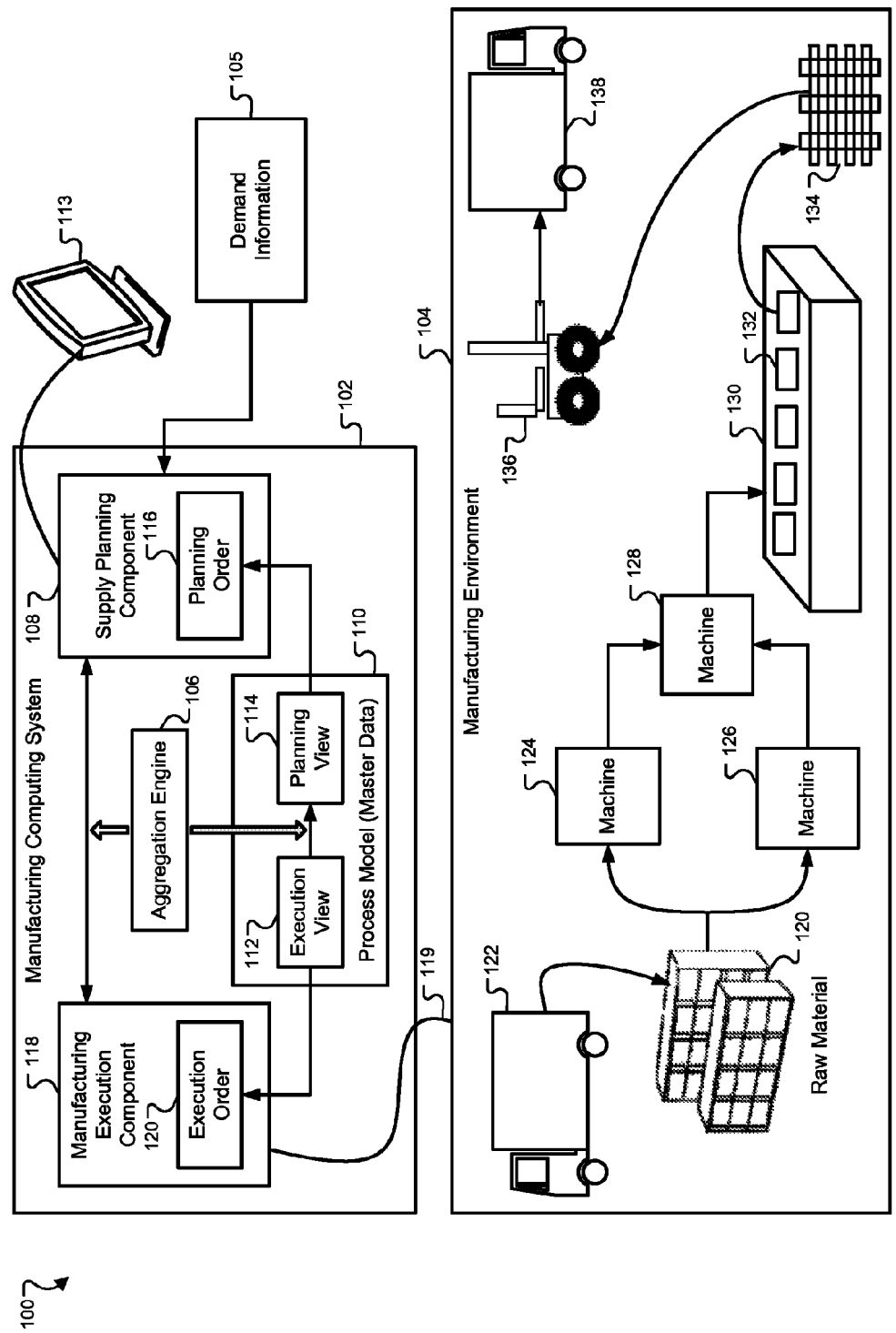
FIG. 1A is a block diagram of an exemplary manufacturing entity in which a manufacturing planning and execution computing system is used.

The manufacturing planning and execution computing system 102 has a supply planning component 108 and a manufacturing execution component 118. The supply planning component 108, which also may be referred to as a manufacturing planning component, is a tool that a user may employ to plan how the manufacturing environment 104 can be operated to achieve a supply of end products that meets a specified demand. The planning component 108 receives, as shown in FIG. 1A, demand information 105, which may, for example, be in the form of a customer order that the manufacturing entity 100 supply a specified number of product within a specified timeframe, or the demand information may be internally generated by the supplier or manufacturer based on a forecast. The planning component 108 produces planning production orders 116, which may be used in the generation of a separate execution order 120, which is used by the execution component 118 in executing the manufacturing process to meet the demand input. A user station 113 is shown in FIG. 1A to illustrate that a planning user may interact with the manufacturing computing system 102 to perform supply planning functions, described in more detail later.

The manufacturing execution component 118 is the "execution" portion of the manufacturing planning and execution system 102. The execution component 118 operates to control and track the execution of the manufacturing process carried out by the manufacturing environment 104 in accordance with execution orders 120. As such, FIG. 1A shows that there is an interface 119 between the manufacturing execution module 118 and the manufacturing environment 104, which interface 119 serves to integrate the computing system 102 with the manufacturing environment 104, or shop floor. For example, the interface 119 allows the computing system 102 to provide instructions that control when and where materials and resources will be used in the manufacturing environment 104, as well as the ability of the computing system 102 to receive input from the manufacturing environment 104, for example, confirming that a certain manufacturing operation has been completed.

The manufacturing planning and execution computing system 102 includes predefined manufacturing process master data, including routing definitions, shown in FIG. 1A as stored in repository 110. In particular, there are two levels of defined master data stored in repository, execution-level (or "execution view") master data 112 and planning-level (or "planning view" master data 114). The execution-level manufacturing process master data are, in a typical case, defined by a process designer or engineer. The execution-level master data typically define each of the operations of the manufacturing process in detail, and how each of the operations relates to other operations. The execution-level manufacturing master data are generally defined up front, before the manufacturing process is ever run, and are generally not changed very frequently. In some cases, however, the master data may be changed more frequently, and evendaily.

The planning-level master data 114 is generated from the execution-level master data 112, using grouping and aggregation methods that will be described in more detail later. An aggregation engine 106 included in the manufacturing computing system 102 includes aggregation rules for generating the planning-level master data 114 from the execution-level master data 112. The supply planning module 108 uses the planning-level, or "planning view," manufacturing process master data stored in repository 110 in the planning operations that the supply planning component 108 performs. The planning-level master data may also be referred to as a planning process model, or a "rough-cut model."

Generally, many manufacturing operations for execution are defined in the execution-level master data to make up the overall manufacturing process. The planning component 108, instead of using the execution view master data that includes all of the defined execution operations, uses the planning-level master data during the planning process. For example, a manufacturing process of twenty defined execution operations may be grouped into three planning, or "rough-cut," operations of, for example, six execution operations for a first planning operation, eight execution operations for a second planning operation, and six execution operations for a third and final planning operation. By using grouping and aggregation functionality to create separate planning-level master data to use in the planning process, constraints arising from any of the execution operations may be accounted for in the planning process (or ignored if the details are not needed), but the level of granularity will be appropriate.

In addition, the manufacturing computing system 102 may also allow a user to select the level of granularity desired in the planning process by selecting which of the execution operations will be grouped into a planning, or rough-cut, operation. The user may do this by putting "markers" in the overall process flow of execution operations, and the markers, in addition to the beginning and end points of the overall process flow, will serve as end-points of the execution operations that are grouped into a single planning, or rough-cut, operation. For example, for a routing that has 20 execution operations, setting a marker between execution operations six and seven and another marker between execution operations fourteen and fifteen will yield three planning operations oft respectively, six, eight, and six execution operations. In one implementation, a user may set the markers, and hence define the groupings of execution operations, once, and then the planning master data 114 will be created based on these groupings and stored in the master data repository 110. Then, the planning master data 114 created using those groupings will be used in the planning process for a particular demand input 105, and will have a level of granularity defined by the groupings. If more granularity is desired, the markers may be redefined to have more planning operations, and new planning master data may be created with the newly defined groupings. In addition, several different groupings may be defined and master data generated for use in planning, and in addition, it may be possible in some implementations to change the grouping definitions during the planning process.

In addition, a user may select to filter selected materials and resources out of the planning process. This may be done, for example, for materials and resources that are known to not be "critical path" components and need not be considered during planning. This may also be done to reduce the number of things a planner is to consider during a planning process. In a further example, a user may select the accuracy for the capacity planning so that the constraints for resource capacity supply and capacity requirements in planning may be relaxed based on the selection. This will be described in more detail later in the context of performing rough-cut planning.

The planning component 116 may use a predefined "rough-cut" planning data structure that is part of the planning master data 114. This rough-cut data structure defines the structure of each planning, or rough-cut, operation and defines the relationship of resource capacity requirements to the planning operation. The rough-cut data structure will be described in more detail later.

As mentioned previously, the supply planning component 108 prepares a planning-level electronic production order 116. At an appropriate point in time, the planning-level production order may be released for execution, at which time an execution-level production order 120 may be generated using the execution-level data 112 and information defined in the planning-level production order 116. The aggregation engine 106 is also involved in this process, as is described later. The execution order 120 will be used by the manufacturing execution component 118. The planning order 116, as will be explained in more detail later, will typically include a calculated time duration measure required for each of the defined planning operations, or rough-cut operations. In addition, the planning order 116 may also include a rough planned schedule for the rough-cut operations, a list of selected and non-filtered, manufacturing material requirements and resource capacity requirements, and scheduled times of when the material and resource capacity requirements will be needed. The planning order 116 is prepared at a level of granularity corresponding to the level of granularity of the planning-level master data 114 used in the planning process. Later, when the planning order 116 is released for execution, the aggregation engine 106 is used, this time in the inverse, to generate an execution order from the execution master data 112 that is consistent with scheduling included in the planning order 116.

The production environment 104 shown in FIG. 1A is a simplified example of a complete manufacturing process to produce a product from beginning to end. The process in this example includes both production (making) and logistics (moving) functions. The process begins with the delivery of raw material from a truck 122. The raw material is shown being stored in a storage area 120. From there, the raw material may be processed by one of two alternative machines 124 and 126. The output of both machines 124 and 126 feeds into another machine 128. The output of machine 128 feeds into a transport process, such as a conveyor system 130, that delivers the output products 132 of machine 128 to an output staging area where the output product 132 is loaded onto pallets 134. There may also be a packing operation to package the output products 132 before they are loaded onto pallets. A forklift 136 is then used to load pallets of finished and packaged product into a truck 138 for final delivery. It will be appreciated that the FIG. 1A example is a simplified high-level depiction of a manufacturing environment 104 for illustration purposes only, and that an actual environment may be much more complex and involve many more execution operations.

The execution component 118 performs execution and control functions on the manufacturing environment 104 according to the generated execution order 120. For example, the execution component 118 may instruct the manufacturing environment 104 to execute the operations or the sub-activities. Upon receiving the instructions, the manufacturing environment 104 may execute the received instructions and report status of the production floor 104 to the execution component 118.

The computing system 102 may generate various different user interface views to assist both the planning component 108 and the execution component 118. The system 102 may generate a planning board and various execution information screens, for example. The planning board may provide a visual display of the process flow using planning operations, as defined by markers selected by a user, as separate blocks of the overall process flow. The planning board may be used during a planning function, and the execution screens may be used in an execution function.

FIG. 1B shows a more detailed view of an example manufacturing computing system 102 shown in FIG. 1A. Many of the components shown in FIG. 1B have already been described in connection with FIG. 1A. The following discussion of FIG. 1B will address the general operation of the system 102 in the context of planning functions. First, as shown in FIG. 1B, the aggregation engine 106 includes aggregation rules and parameters 107. The aggregation rules and parameters 107 may be predefined rules that enable a translation between execution-level information and planning-level information, and vice-versa. Generally, the rules and parameters 107 may define how several execution operations may be aggregated into a single planning operation, and may define relationships, including timing relationships, between various defined planning operations. In addition, the aggregation rules and parameters 107 may be used in an inverse manner in the generation of an execution order 120 from a planning order 116. The rules may include pre-configured rules for how aggregations are performed given user-supplied parameters, which will be described in more detail later.

As shown by arrow 122, the aggregation engine 106 is used in the generation of the planning-level master data 114 from the execution-level master data 112. Then, as shown by arrow 124, the planning-level master data 114 is used to produce the planning order 116. The execution-level master data 112 and the planning order 116 are both used to generate the execution order 120, as shown by arrows 126 and 128. In one implementation, the execution order 120 is generated initially based on the execution-level master data 112, and then the planning order 116 is used for the scheduling information it contains. The aggregation engine 106 is used in this process to ensure that the detailed scheduling that occurs as part of generating the execution order 120 is consistent with the planning order 116 and its defined level of granularity and how the groupings are defined.

Although it is contemplated that in the typical scenario the execution order 120 is generated from the planning order 116, it is also possible that the planning order 116 may be generated from the execution order 120. As such, arrow 128 between the manufacturing execution component 118 and the supply planning component 108 is shown as a two-way arrow. In addition, in some cases the execution order 120 may get revised during execution, for example, because the manufacturing process may be ahead of or behind schedule. In such a case, the planning order 116 may be updated so that additional planning processes that take into account the information set forth in the planning order 116 may take the changed circumstances into account. Here again, when the planning order 116 is updated by a revised execution order 120, the aggregation engine 106 may be involved in the process to make the necessary translations.

In the implementation shown in FIG. 1B, the execution view master data 112 includes execution-level resources 112a; an execution-level routing 112b that defines the execution-level operations, inter-relationships between the operations, and where resources and materials are used in the operations (and which resources and materials are used in the operations); and an execution-level bill of material 112c that defines constituent materials that make up an end product produced by the manufacturing process. Similarly, the planning view master data 114 includes planning-level resources 114a; a planning-level routing 114b that defines the planning-level operations, inter-relationships between the operations, and where resources and materials are used in the operations (and which resources and materials are used in the operations); and a planning-level bill of material 114c that defines constituent materials that make up an end product produced by the manufacturing process. As will be described in more detail later, a number of execution-level resources may be grouped to define a planning-level resource, a number of execution-level operations may be grouped to define a planning-level operation, execution-level resources and BOM materials may be filtered so that they are not included in the planning-level resources or the planning-level BOM, respectively.

Figure 1C:
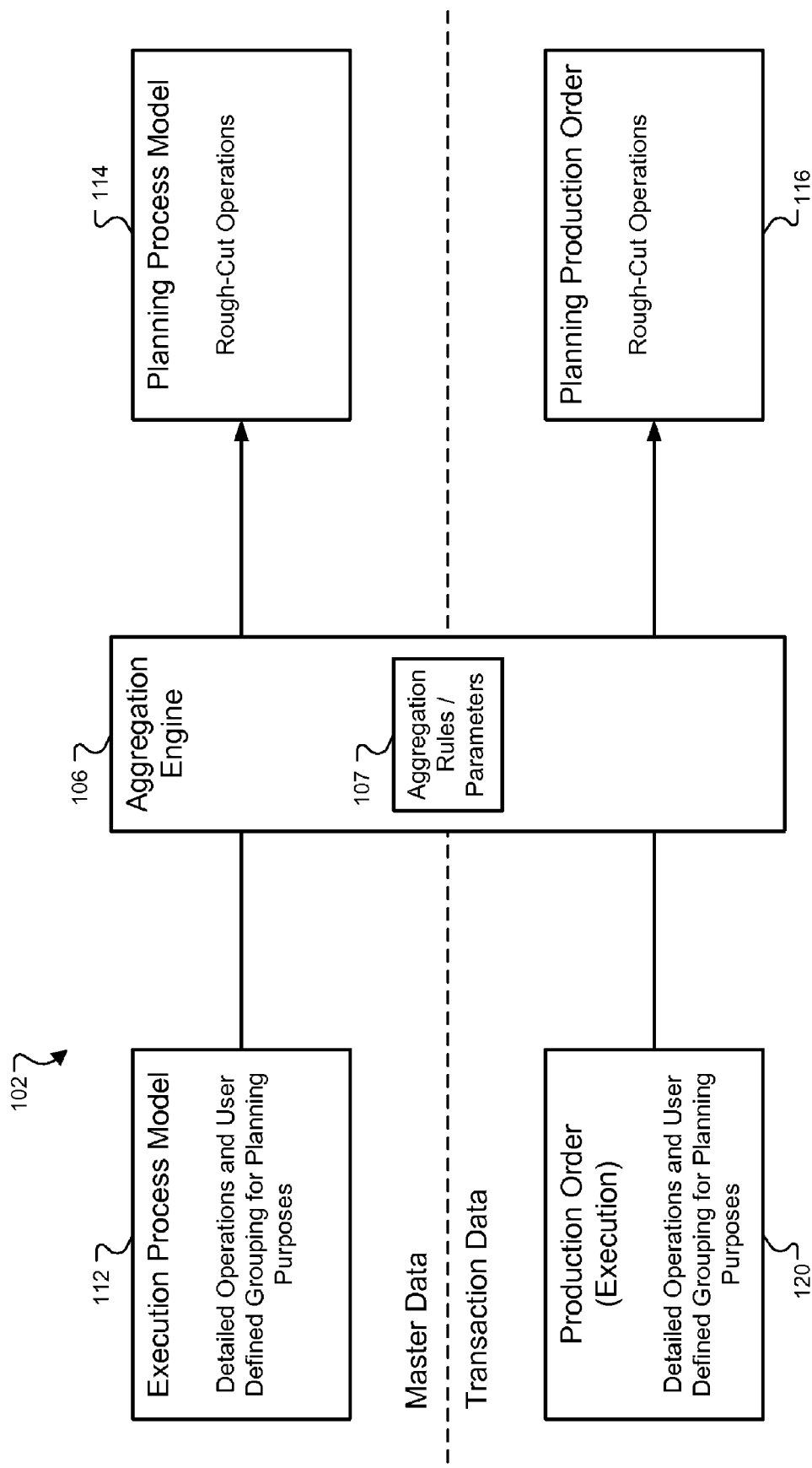

Referring now to FIG. 1C, another depiction of the system 102 shown in FIGS. 1A and 1B is shown to illustrate another point. In particular, FIG. 1C illustrates that the aggregation engine 106 is used both in generating planning-level master data 114 from execution-level master data 112 (that is, a master data layer), and in generating planning production orders 116 (that is, at a transactional data layer), for example from execution production orders 120 if an execution production order 120 has already been generated. A main use for the translation from an execution order to a planning order is updating a planning order with execution order information, as described earlier.

As shown in FIG. 1C, the execution-level master data 112 may also be referred to as an execution process model, and includes definitions for the detailed execution-level operations. In addition, the execution-level master data 112 may also include user-defined groupings, for example of one or more execution-level operations or of execution-level resources. The planning process model 114 includes definitions for planning operations, which may also be referred to as rough-cut operations. This may be the data structure for the rough-cut operation described previously. In addition, the execution-level production order 120 may similarly include information about the detailed operations, but in this case, it will be information about the operations for a specific order. Again, the execution-level production order 120 may include user-defined groupings for planning purposes, which may not be the case in all scenarios. The planning production order 116 also includes information about rough-cut operations, although in this case it will be the rough-cut operations for a particular order.

Figure 1D:
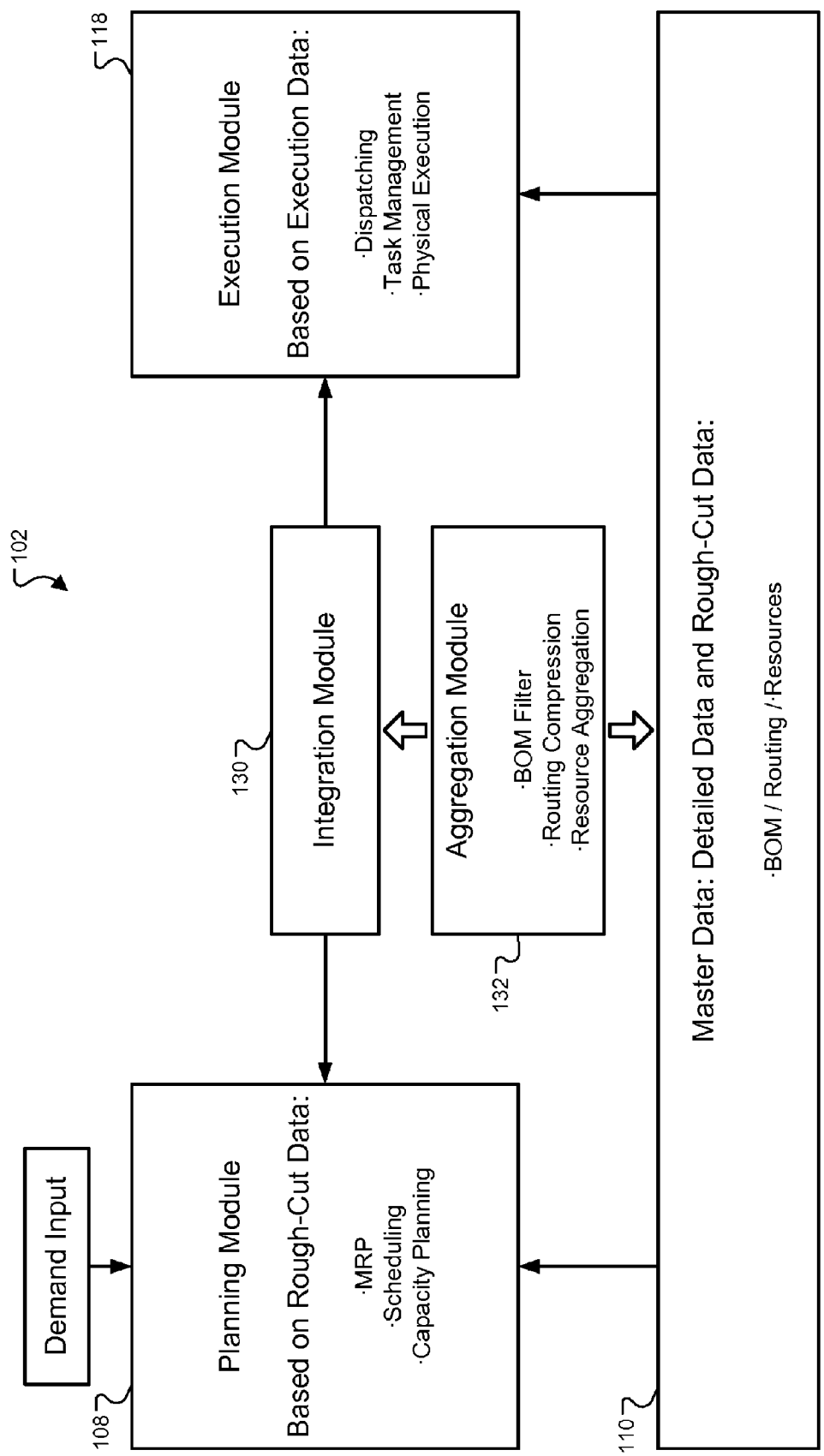

FIG. 1D shows another perspective of the system 102 shown in FIGS. 1A-D. Here it is shown that the planning component, or module, 108 includes various planning functionality to perform manufacturing resource planning (MRP), scheduling, and capacity planning, for example. These functions will be described in more detail later. In addition, the functions are performed using rough-cut data as generated using the rough-cut process model, or planning master data, stored in master data repository 110. FIG. D also shows that the execution component, or module, 118 includes various execution functionality, including for example dispatching functions (for example, to dispatch materials or resources to be used in the manufacturing process), task management, andphysical execution. These functions are performed using detailed, or execution-level, data.

FIG. 1D shows that the system 102 has an integration module 130, which integrates the execution module 118 and the planning module 108. As shown, an aggregation module 132 works in concert with the integration module 130. As will be described in more detail later, the aggregation module 132 includes a bill of material filter to filter material requirements that are not planning relevant, routing compression functionality to aggregate grouped execution-level operations into a few number of planning-level operations (and vice-versa), and resource aggregation functionality to aggregate two or more execution-level resources into one virtual planning-level resource (and vice-versa).

Figure 2:
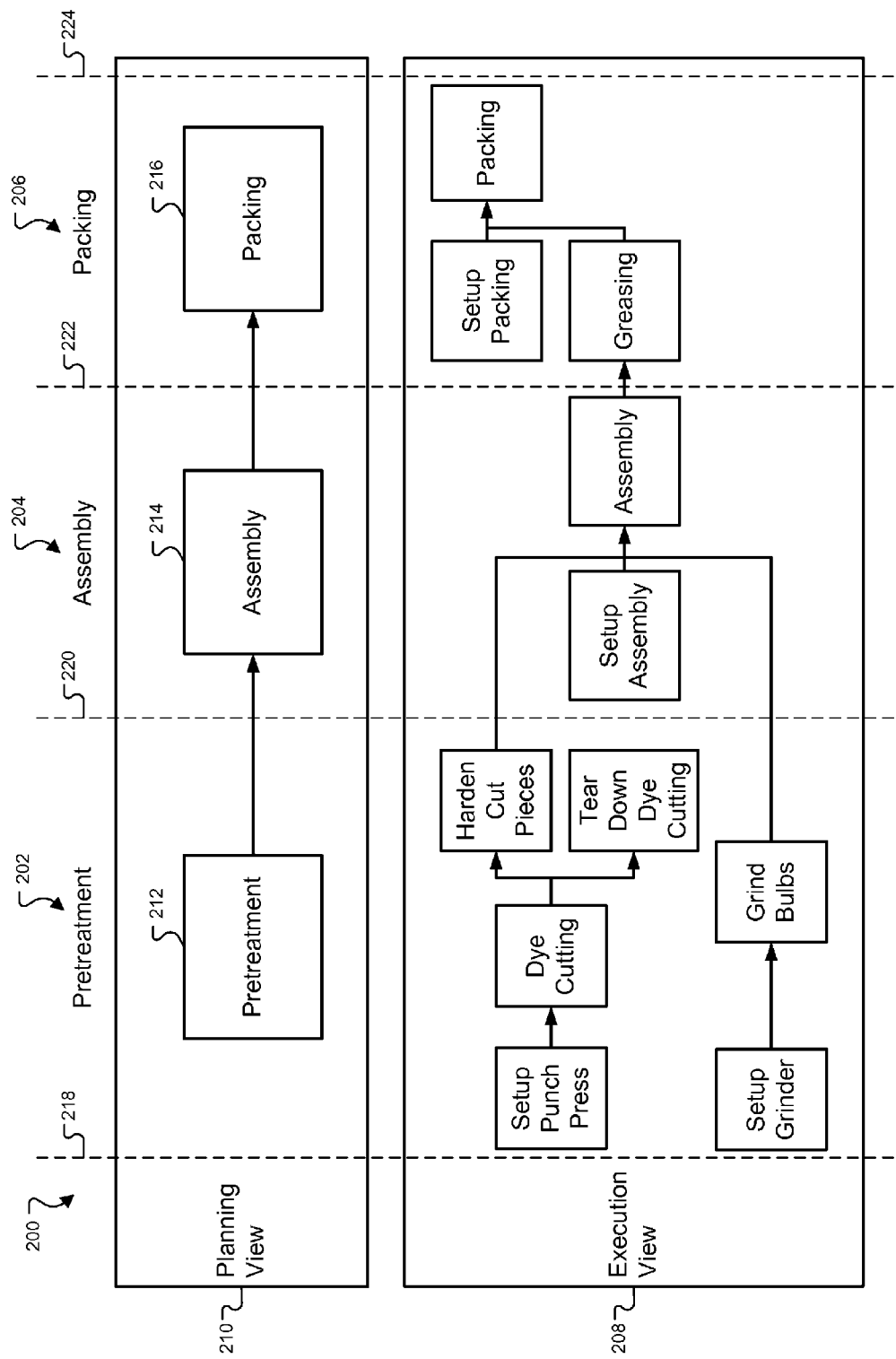
FIG. 2 is a diagram that illustrates execution view and planning view versions of a manufacturing process master data.

FIG. 2 is a diagram 200 that illustrates the different levels of granularity in an execution view 208 (that is, execution-level master data 112, as shown in FIG. 1A) versus a planning view 210 (that is, planning-level master data 114). In the planning view 208, the production floor operations may be represented as three production stages, a pretreatment stage 202, an assembly stage 204, and a packing stage 206. As such, the supply planning module 108 may generate a planning production order 116 (see FIG. 1A) that includes scheduling and time duration information for the three planning-level operations 212, 214 and 216. Each of the three planning operations 202, 204 and 206 is made up of a defined group of execution-level operations. For example, the pretreatment planning operation 212 is an aggregation of six execution-level operations, namely, setup punch press, dye cutting, harden cut pieces, tear down dye cutting, setup grinder and grind bulbs. The assembly planning-level operation 214 is an aggregation of two execution-level operations, namely, setup assembly and assembly. The packing planning-level operation 216 is an aggregation of three execution-level operations, namely, setup packing, greasing, and packing.

Not all of the information included in the execution view 208 may be relevant to planning. For example, a planning user may only be interested in scheduling a high level of granularity of the three main planning-level operations including pretreatment 202, assembly 204 and packing 206. The planning user may be not be interested in scheduling at a detailed level of activities such as setup activities, tear down activities, or the like. Accordingly, the planning user may define the rough-cut operations shown in the planning view 210 by placing user-selected markers in the execution routing. In this example, the user has defined three planning operations of interest, a pretreatment operation 212, an assembly operation 214, and a packing operation 216. The planning user may then define the planning operations 202, 204, 206 by placing user-selected markers to group execution operations in the execution view 208. FIG. 2 also shows planning operation borders 218, 220, 222, 224. Users may place marks in the execution routing at the position of the borders 220 and 222 to define the planning operations 212, 214, 216. For example, the pretreatment operation 212 is defined by the border 218 and the border 220 and may have characteristics approximated using the characteristics of the activities and operations include between the borders 218 and 220 in the execution view 208. The detail of the placement of the user-selected points will be discussed below.

Figure 3:
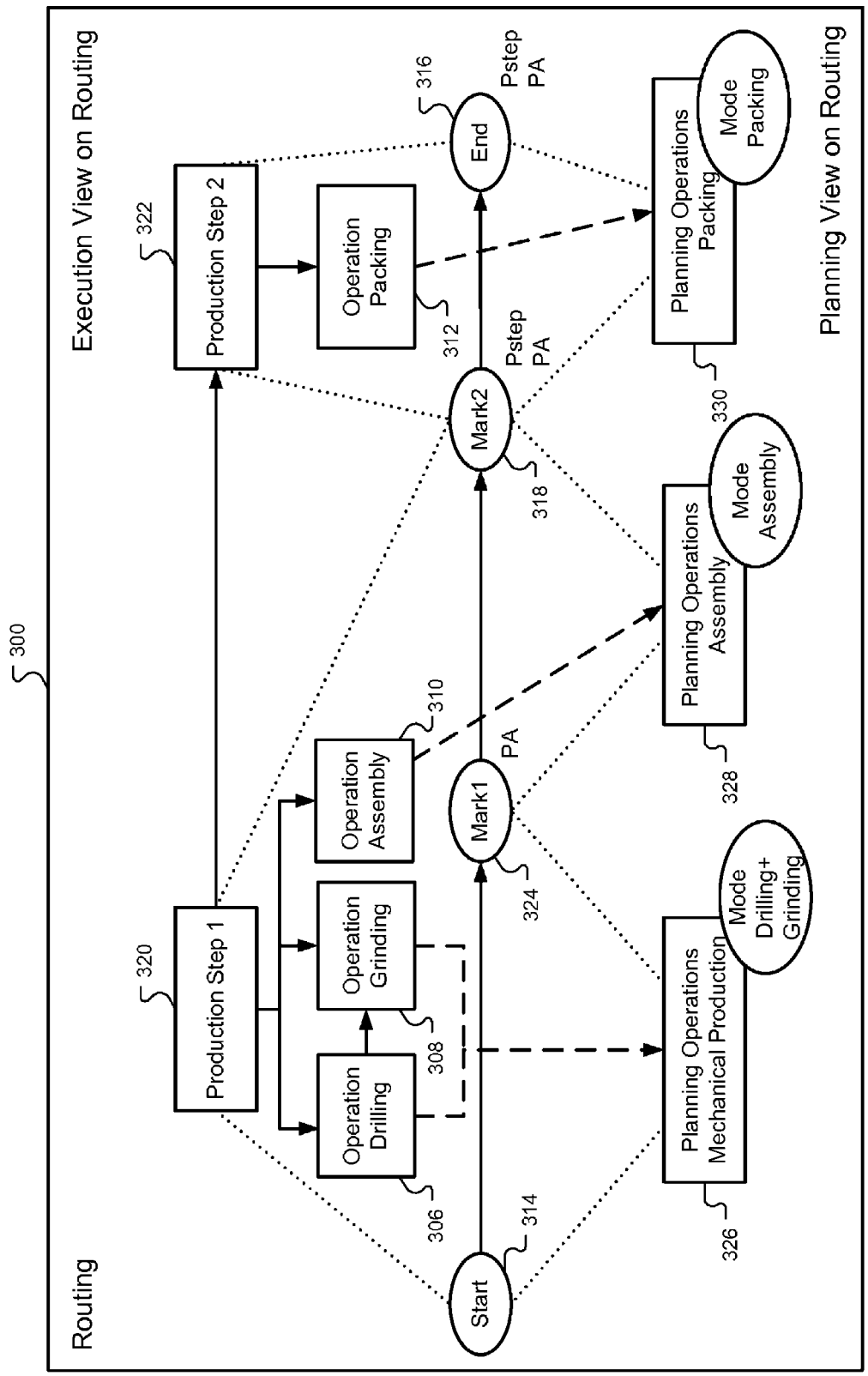
FIG. 3 is a block diagram of an exemplary routing that includes production steps and planning operations that may be defined by a set of markers.

Referring to FIG. 3, there is another conceptual depiction of a routing 300 that illustrates the difference between the detailed execution-level operations of the execution view of the routing, and the less granular planning-level operations of the planning view of the routing. In addition, FIG. 3 shows the use of markers, and specifically two different types of markers, that define different groupings. One set of markers are "planning activity" (PA) markers, and these define the groupings for the planning-level, or rough-cut operations used for planning purposes. The other set of markers are "production step" (PStep) markers, and these define groupings that are used in functions that are unrelated to planning, such as in execution to define the points in time where confirmations are made as to when a confirmation if completion is made at an intermediate point in the execution of an execution production order.

The top half of FIG. 3 shows the execution view of the routing 300, and includes all of the detailed execution-level operations of the routing 300 and the interrelationships between the execution-level operations as defined in the routing 300. Also shown on the top half of FIG. 3 are the defined production steps 320 and 322, which are aggregations of the execution-level operations as defined by the PStep markers 318 and 316. The bottom half of FIG. 3 shows the defined planning-level, or rough-cut, operations, which are aggregations of the execution-level operations as defined by the PA (planning activity) markers 324, 318 and 316, in connection with start marker 314.

In the depicted example, the execution view of the routing 300 includes an operation drilling 306, an operation grinding 308, an operation assembly 310, and an operation packing 310. In some embodiments, a routing may be defined by a start mark 314 and an end mark 316, which defines the borders of planning activities and production order.

In some embodiments, a grouping element, called a marker, for planning and execution purposes may be defined to flexibly divide a routing into several production steps and planning activities. A user may define a marker to serve many different functions. In one example, a user may define a planning mark that serves as a border of a planning operation. In another example, a user may define an execution marker to define the border of a production step. In a further example, a user may define a marker as a reporting point to indicate a time for counting actual production quantities in the production process. If there is no marker in a routing, then the whole routing may be defined as a single production step or a single planning activity. A user may define and understand, through the use of the markers, the main material flow and main sequence of a routing.

In the example in FIG. 3, a default may be predefined with the start mark 314 and the end marker 316 originally set to group all defined execution operations into a single step. A user may place a marker 318 in the routing 300 to define a first production step 320 and a second production step 322. As shown in FIG. 3, the production step 320 may include the operation 306, the operation 308 and the operation 310, which are bracketed by the start marker 314 and the marker 318. The production step 322 may include the operation 312, which is bracketed by the marker 318 and the end marker 316.

The routing 300 also includes a user-selected marker 324 that together with the start marker 314, the marker 318, and the end marker 316 define three planning-level,or rough-cut, operations 326, 328, 330. The planning operation 326 may include the operation 306 and the operation 308, which are bracketed by the start marker 314 and the marker 324. The planning operation 328 may include the operation 310, which is bracketed by the marker 324 and the marker 318. The planning operation 330 may include the operation 312, which is bracketed by the start marker 318 and the end marker 316.

Referring now to FIGS. 4A-4E, there are several flowcharts that illustrate operation of the system of FIGS. 1A-D in performing manufacturing planning. Starting with FIG. 4A, there is shown a flowchart of major steps in a computer-implemented method for first, generating planning-level master data and, second, using the generated planning-level master data in performing a planning process. The method shown in FIG. 4A may be performed, for example, by the supply planning component 108 of the FIG. 1A system 102.

First, in step 402, user definitions of groupings of execution-level entities are received. The execution-level entities may be, for example, execution-level operations, such as the operations illustrated in the execution view 208 of FIG. 2. This may be done, for example, by setting planning activity markers, as illustrated in FIG. 3. Additionally or alternatively, the execution-level entities may be execution-level resources, such as human resources or machines and other equipment to perform manufacturing functions. In this case, the resources included in the grouping may be similar resources that may be considered as a single resource for planning purposes. The user definitions may be entered, for example, using the client device 113 shown in FIG. 1A.

Next, in step 404, there is performed various aggregations using the user groupings defined in step 402. This is done as part of a process of generating the planning-level master data that later will be used in performing a manufacturing planning process for a particular demand input. Several different types of aggregations may be performed. First, there may be an aggregation of time duration information associated with execution-level operations that are grouped into a single planning-level operation, so that there is aggregated time duration information associated with the planning-level operation. Second, there may be an aggregation of resource capacity requirements associated with execution-level resources that are consumed in one of the grouped execution-level operations and that are defined to be included in a planning level resource. The execution-level resource requirements that are aggregated may be associated with the same execution-level resource but which are consumed in different grouped execution-level operations, and may be associated with different execution-level resources that are grouped together as a single planning-level resource. Third, where there is a grouping in step 402 of different execution-level resources into a single planning-level resource, there may be an aggregation a capacity supply associated with each of the grouped execution-level resources to define a capacity supply for the defined planning-level resource. The aggregation function of step 404 may be performed, for example, using the aggregation engine 106 shown in FIGS. 1A and 1B, using the aggregation rules and parameters 107 that have been configured for the aggregation engine 106 (for example, with the rules being preconfigured rules for how aggregations are performed and the parameters being user-defined information, such as the groupings defined in step 402). Steps 402 and 404, together, generate the planning-level master data from the execution-level master data.

The configuration steps of 402 and 404 may be performed one time for several planning processes. In other words, the groupings may be defined and planning-level master data generated once, and that same planning-level master data may be used in planning processes for different manufacturing orders. In addition, multiple sets of planning-level master data may be generated for different granularities of users, and then the planning user performing a particular planning task may select one of the granularity levels to use in the planning process.

The planning process of steps 406 and 408 may be performed, for example, by the supply planning component 108 of the FIG. 1A system 102. In step 406, the planning process begins with generating a planning order for a particular demand input that may, for example, identify the product to be manufactured, a quantity to be manufactured, and a requested delivery or completion date. The planning order is generated using the planning-level master data. This function may be performed, in one implementation, without user involvement, or in other words, the planning order may be generated automatically. This step 406 may produce, for example, time duration measures for each of the defined planning-level, or rough-cut, operations and time relationships between the rough-cut operations. In addition, the step 406 may produce capacity requirements for defined planning-level resources, which may include capacity requirements for defined groups of resources. It may be noted that duration, time relationships and capacity requirements are generated from the predefined master data by multiplying pre-aggregated variables by the order quantity, although in addition to variable parameters, there also may be fixed parameters that are included in the calculations.

Next, in step 408, the generated planning order is scheduled. This step may be performed either automatically or with user involvement. In one implementation, the generated rough-cut operations, including calculated intra-operation time durations and inter-operation timing relationships, are scheduled in a unified planning calendar that includes already scheduled operations for other demand inputs. By way of example, such a calendar may simply be something that identifies working and non-working times. In addition, the resource capacity requirements, in one implementation, are scheduled in a calendar for the particular planning-level resource.

After step 408, the planning order may be released in step 410. This generally occurs just before the planning order needs to be executed. It may be desirable to not release the planning order earlier than needed because the planning order may be revised in view of later orders that are planned and scheduled. Once the planning order is released in step 410, an execution order may be generated as briefly described previously, and as will be described in more detail later.

Figure 4A:
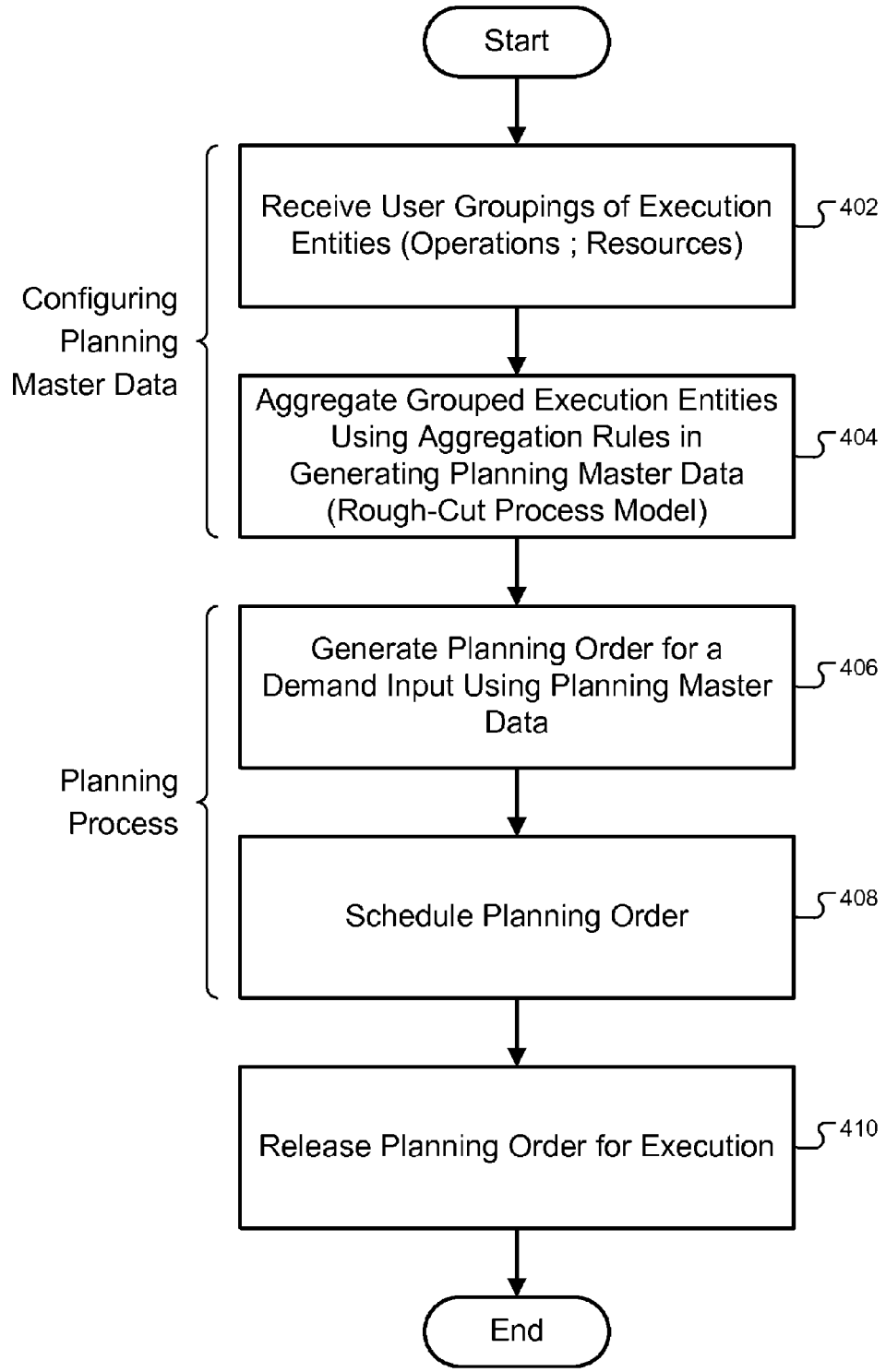
FIG. 4A is a flowchart showing a computer-implemented method for generating and using planning-level master data.
Figure 4B:
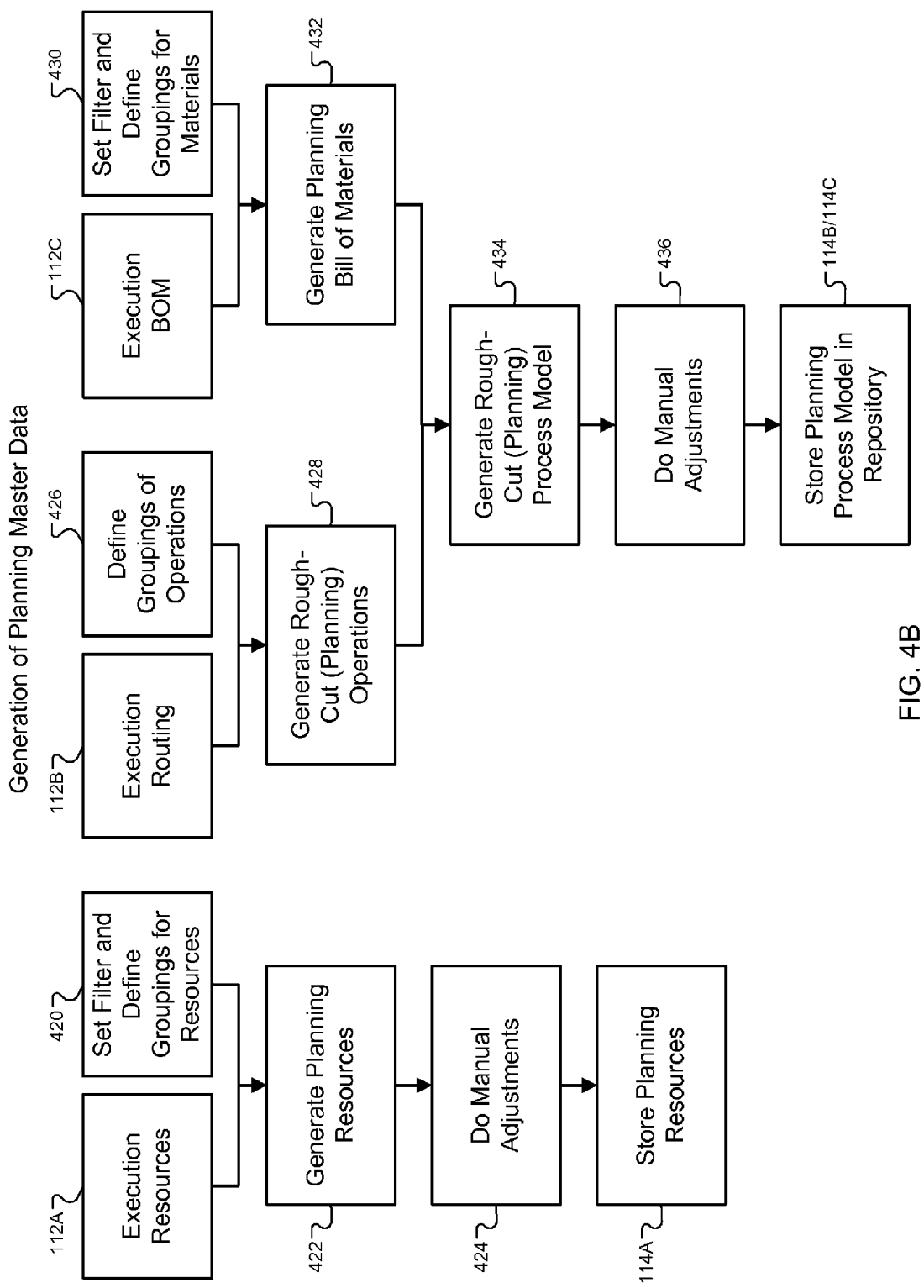
FIG. 4B is a flowchart showing a computer-implemented method for generating planning master data from execution master data.

Referring now to FIG. 4B, there is shown a more detailed flowchart of the computer-implemented method for generating the planning-level master data, which may also be called a rough-cut process model. The flowchart illustrates that the order in which many of the steps are performed is of no consequence, and given that the process may involve user involvement, the order in which the steps are performed may be determined by the user. Also, it can be seen that the execution-level master data of execution resources 112a (see FIG. 1B), execution routing 112b, and execution bill of material (BOM) 112c are inputs to the method. Beginning the discussion with step 420, resource filters are set and groupings of execution-level resources 112a are defined. This may involve user input to identify the execution-level resources that are not needed for planning purposes, and user input to identify different execution-level resources that are to be grouped to define a single planning-level resource. Once the filters are set and the groupings are defined, the planning-level resources are generated at step 422. Where different execution-level resources are grouped to define a planning-level resource, the step 422 of generating the planning-level resources may involve aggregating capacity supply information associated with each of the execution-level resources that are grouped into the planning-level, so there is determined an aggregated capacity supply for the planning-level resource. There may also be additional manual user adjustments at step 424 to the generated planning-level resources before the planning resources 114a in master data repository 110 (see FIG. 1B).

Moving now to step 426, groupings of execution-level operations from the execution routing 112b are defined. The execution-level operation may be similar to those illustrated in the execution view 208 of FIG. 2. This may be done, for example, by setting planning activity markers, as illustrated in FIG. 3. Next, in step 428, the rough cut, or planning-level, operations are generated at step 428. This step 428 will use the execution routing 112b, the planning resources generated at step 422, and the groupings defined in step 426. This step 428 may involve aggregation of information again. For example as described previously, there may be an aggregation of resource capacity requirement information to determine an aggregated resource requirement for a planning-level resource for each of the planning operations, and there may be an aggregation of time duration information to determine aggregated time duration information for each of the planning operations.

Turning now to step 430, a filter for materials is set. This may involve user input to identify the execution-level materials that are not needed to be considered for planning purposes. Then, at step 432, a planning-level bill of materials is generated. From the generated rough cut operations and the generated planning level bill of materials, a rough-cut (planning) process model is generated at step 434. Again, there may be user adjustment to the rough-cut process model at step 436. The rough-cut process model is then stored in master data repository 110 (see FIG. 1B). While the routing and BOM data are shown as separate entities in the master data repository 110, the routing an BOM data in one implementation is structured in an inter-related way such that together they make up a rough-cut process model.

Figure 4C:
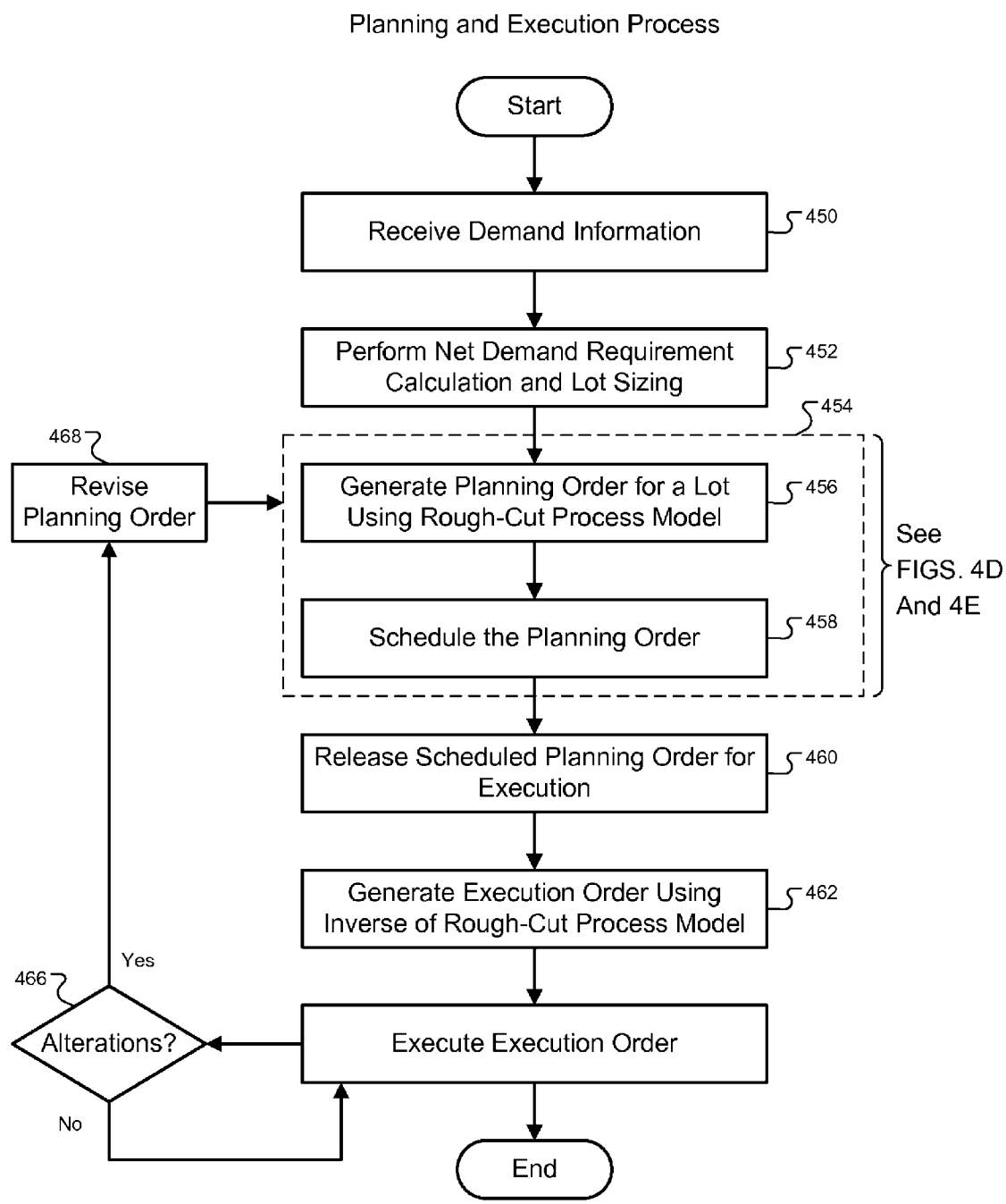
FIG. 4C is a flowchart of a computer-implemented method for planning and executing a manufacturing process.

Referring now to FIG. 4C, there is shown a flowchart that illustrates a computer-implemented method for planning and executing a manufacturing order. First, in step 450, the method begins with receipt of demand information. The demand information may include, for example, a customer order and forecasted information. The demand information may include, for example, an identification of the products to be supplied, the quantity to be supplied, and a requested date for delivery.

Before starting the planning process, in step 452 there is performed a process for determining, firstly, a net demand requirement, and secondly, manufacturing lots. Net demand may be determined because, for example, there may already be goods in inventory or in process of being manufactured that may be used to satisfy the demand information received in step 450. The net demand requirement may then be divided into multiple manufacturing lots using a lot-sizing process. The lot then becomes the subject of a production order in later steps of the process. It will be appreciated that there may be a looping through step 452 and the following step 454 in a case where materials requirement planning logic is employed. The step 454 may be performed multiple times for intermediate materials included in a multi-level bill of material, for example. The step 454 that follows is from the perspective of a single product being planned.

Figure 4D:
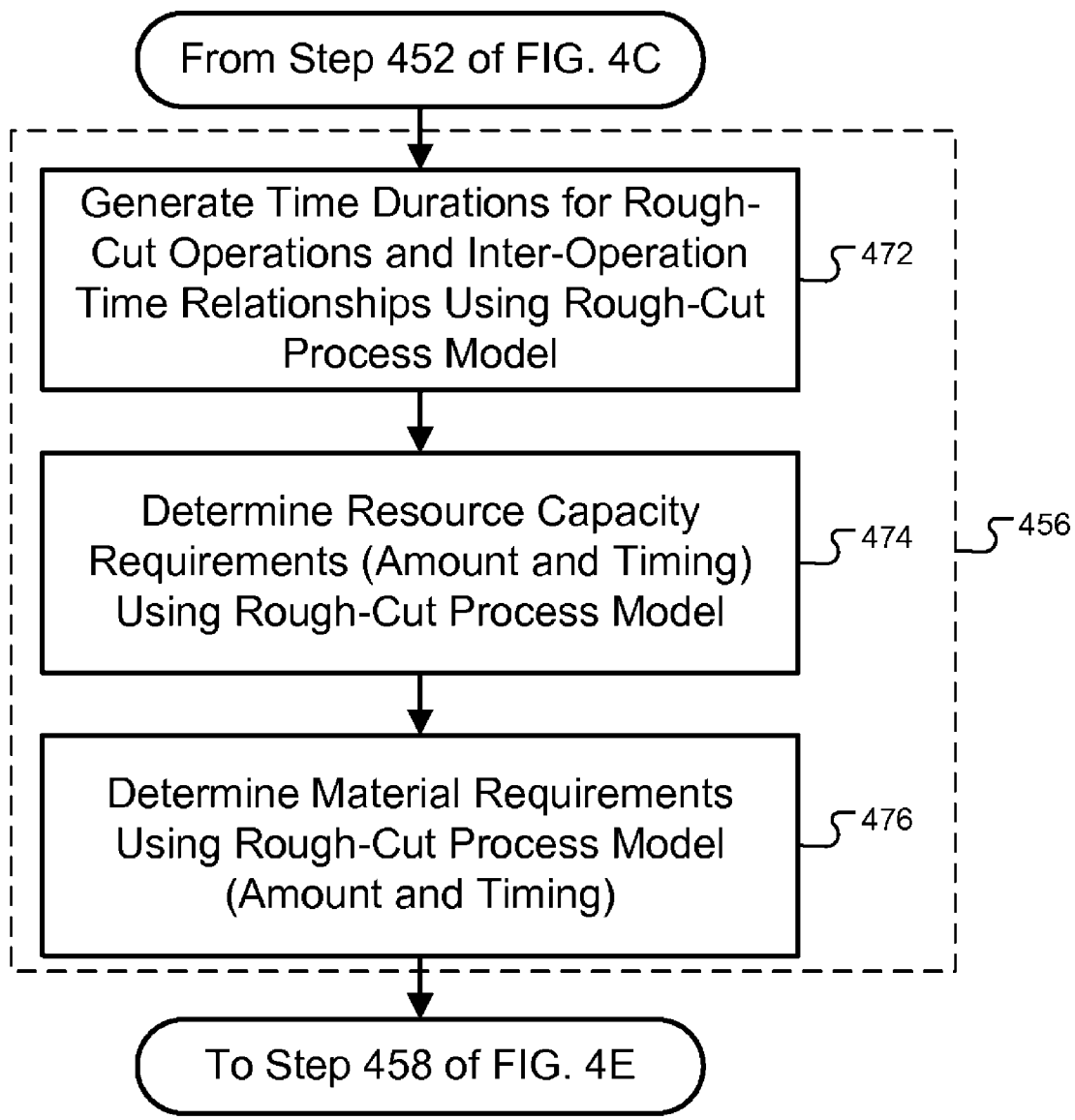
FIGS. 4D-E are a flowcharts with further details of an example method used in the method of FIG. 4C.
Figure 4E:
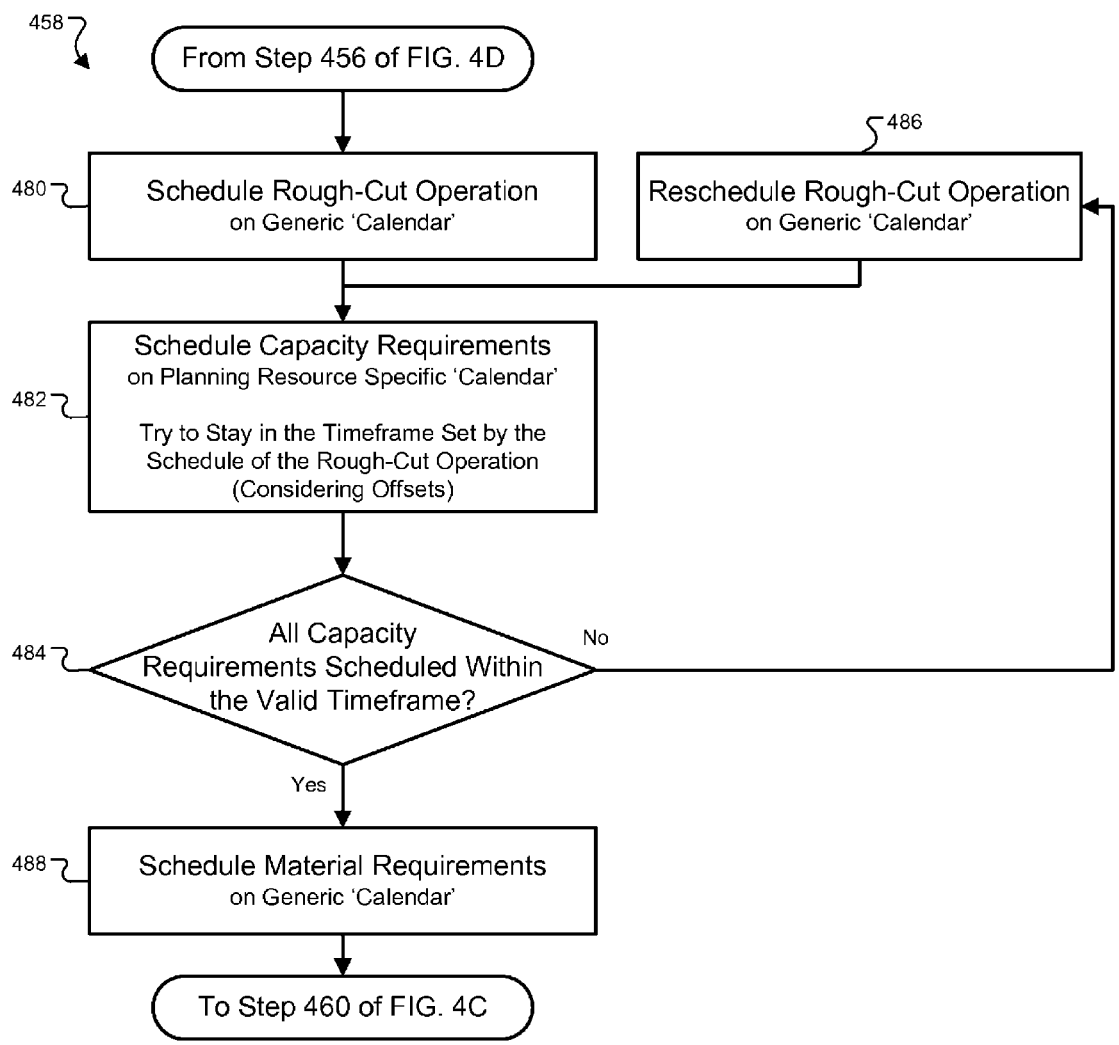

Next, the method proceeds to step 454 where a planning process on the lot is performed. The details of step 454 are shown in FIGS. 4D-E. For present purposes as shown in FIG. 4C, the planning process 454 includes a step 456 of generating a planning order for the lot using the rough-cut planning model. Then at step 458 the planning order is scheduled. At some point after the planning process is complete, the scheduled planning order is released for execution in step 460. After the scheduled planning order is released, an execution production order is generated at step 462. This may be done, in one implementation, by using the execution-level master data, and performing scheduling of execution operations and resource and material requirements that are consistent with the scheduling contained in the planning order. In addition, an inverse of the rough-cut process model may be used in the process of translating the scheduling parameters of the planning order to the scheduling for the execution order.

FIG. 4C also illustrates that the execution order may be altered at some point after the planning order has been released. In this case, it may be detected if there are alternations at step 466. If so, then a process may be initiated so that at step 468 the planning order may be revised. This may be desirable because even released planning orders constrain times in which future manufacturing lot operations may be scheduled.

Referring now to FIG. 4D, the details of the planning process 456 of FIG. 4C are shown. The first major step 456 involves, generally, the generation of the rough-cut operations and resource capacity and material requirements. The main variable in these calculations will be the quantity of product to be produced for the lot. Step 456 begins with sub-step 472 where time durations are generated, or calculated, for each of the rough-cut operations, and in addition, inter-operation time relationships are determined. These time measures are calculated using the rough-cut process model.

Next, in step 474, planning-level resource capacity requirements are calculated. This will be done for all execution resources that are defined to not be filtered, for example, in step 420 of the FIG. 4B method, and in addition, it is performed for defined groups of execution resources that are defined as a single planning resource. In this step 474, both the amount of the capacity required and the timing for when the capacity is needed within the duration of its planning operation is determined. Again, this is determined using the rough-cut process model. In one implementation that will be described in more detail later, the timing of the resource capacity requirement will fall or occur within the time-frame for a rough-cut operation in which the resource is used. In addition, timing offsets for the resource capacity requirement within the duration of the rough-cut operation may be generated or defined, such as in step 428 of the FIG. 4B method. Details of how the offsets are defined and used will be described later. Next, in step 476, material requirements are determined for unfiltered planning-level resources using the rough cut process model.

The method then proceeds to the step 458 of scheduling the order, the details for which are shown in FIG. 4E. The scheduling step 458 begins with step 480 where the rough-cut operations are scheduled in a generic calendar. As described previously, the calendar may simply be something that indicates working times and non-working times. Next, in step 482, the resource capacity requirements are scheduled in the appropriate planning-level resource calendar. In a case where the planning resource is a single execution resource that is not filtered, the resource calendar used in planning may actually be an execution calendar for the resource. In a case where the planning resource is an aggregation of multiple execution resources, a virtual planning calendar for the planning resource may be used, and then that planning calendar may be translated to individual execution calendars when the execution order is generated.

As indicated in the figure, in step 482 there is an attempt to stay in the timeframe set by the schedule of the rough cut operation, considering the offsets for the resource capacity requirements. Next, at step 484, it is determined whether or not all of the planning-level capacity requirements are scheduled within a valid timeframe. If not, processing proceeds to step 486 where the rough cut operation is rescheduled on the generic calendar. Once that is done, processing proceeds again to step 482 where the capacity requirements are attempted to be scheduled again within a valid timeframe. If that is possible as determined at step 484, processing proceeds to step 488, and the material requirements are scheduled on a generic calendar. The method then proceeds to step 460 of the method shown in FIG. 4C.

Figure 5:
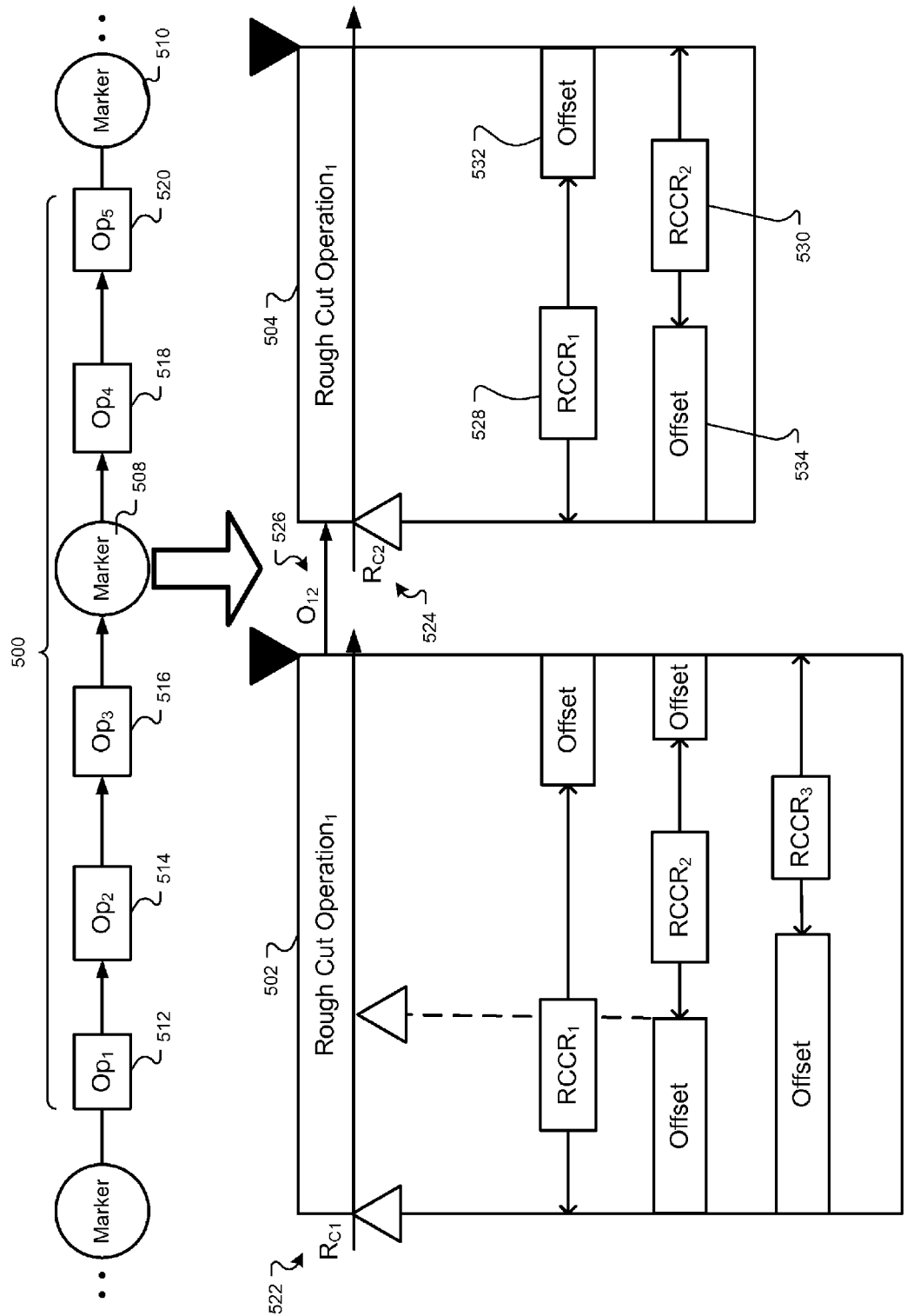
FIG. 5 is a diagram showing an example execution routing of a manufacturing process and a planning routing, including rough-cut operations, generated from the execution routing.

Referring now to FIG. 5, an exemplary operation sequence 500 in an execution routing is shown, along with two corresponding rough-cut operations. As discussed previously, a user may group execution operations into planning, or rough-cut, operations 502 and 504 by placement of a marker 508 in the master data. In this example, a user may group the consecutive operations 512, 514 and 516 into a first rough-cut operation 502 and the consecutive operations 518 and 520 into a second rough-cut operation 504. In configuring the planning-level master data, parameters may be configured to establish time duration parameters both for the duration of a particular rough-cut operation and time duration parameters for inter-operation time relationships.

The inverted dark triangles, one being associated with each rough cut operation, represents the output product for the operation, whether it be an intermediate product in the case of operation 502 or a final product in the case of operation 504 (assuming operation 504 is the final operation of the manufacturing process). The un-shaded triangles pointing to the rough-cut operation header indicate an input material and a time at which the input material is needed. The symbols $R_{C1}$ 522 and $R_{C2}$ 524 associated, respectively, with the first and second rough cut operations 502 and 504 are symbols for generic calendars that are the basis for scheduling the duration of the rough-cut operations.

With respect to the inter-operation time relationship, the relationship between two rough-cut operations may be such that a subsequent rough-cut operation may start before a previous rough-cut operation ends. Alternatively, as is the case in the FIG. 5 example, the second rough-cut operation 504 may occur at some time duration after the first rough-cut operation 502 is completed. In this situation, the time relationship between to the two rough-cut operations 502 and 504 may be referred to as an offset $O_{12}$ 526. In addition, there may be many ways to specify a time relationship between the two rough-cut operations 502 and 504. For example, the time relationship may be measured from the start of the first rough-cut operation 502 the start of the second rough-cut operation 504, or from the end of the first rough-cut operation 520 to the start of the second rough-cut operation. Other time relationship end points may also be used. In the example shown in FIG. 5, the offset 526 is an end-start time relationship between the two rough-cut operations 502 and 504.

The supply planning component 108 may compute or otherwise obtain the time duration measures for an actual production lot being planned during the planning process. In one example, the inter-operation time relationship 526 may be modeled as a linear function with respect to a quantity to be produced. In another example, the inter-operation time relationship 526 may be fixed and stored in the planning view routing information in the database 110 (FIG. 1A).

The rough-cut operation structure depicted in FIG. 5 also illustrates that resource capacity requirements that arise in operations aggregated into a rough-cut operation are associated with the rough-cut operation in which the requirements arise. In this example, the rough-cut operation 502 has three rough-cut capacity requirements (RCCR) associated with it. There may be more resource capacity requirements imposed by the execution operations that are aggregated into the rough-cut operation 502, but those resource capacity requirements may have been defined to be filtered in the process as not being planning relevant, as discussed previously. In addition, there may be a grouping of multiple execution-level resources to define a single planning-level resource. The second rough-cut operation 504 includes rough-cut capacity requirement (RCCR) 528 and another RCCR 530. As discussed previously, the planning-level master data may provide parameters for each of the rough-cut capacity requirements that are necessary to calculate the capacity requirements during a planning process for a particular production lot.

The rough-cut planning structure shown in FIG. 5 also makes use of intra-operation time offsets to impose an additional time constraint on when the resource capacity is going to be required during the course of the rough-cut operation. For example, a first $RCCR_1$ 528 for rough-cut operation 504 has an offset 532 from the end of the rough-cut operation 504. This means that, for planning purposes, the first $RCCR_1$ are going to be required during a time period extending from the beginning of the rough-cut operation to the start of where the offset 532 begins. As such, it may be that the $RCCR_1$ 528 may be required during execution operation 518, and so the $RCCR_1$ 528 will be needed, generally, in the first half of the rough-cut operation 504. By using the offset 532, the $RCCR_1$ 528 is constrained to be scheduled not only within the time constraints of when the rough-cut operation 504 is scheduled, but also within the additional time constraint imposed by the offset 532. A second $RCCR_2$ 530 for the second rough-cut operation 504 has an offset 534 that extends from the beginning of the rough-cut operation 504 to roughly half way through the rough-cut operation 504. As such, the $RCCR_2$ 530 is constrained to be scheduled within generally the latter half of the rough-cut operation 504 time duration. This may be, for example, that the $RCCR_2$ 530 is imposed by the execution operation 520.

As discussed previously, there may be RCCRs that are aggregations of resource capacity requirements that arise in multiple execution operations but in the same rough-cut operation. These aggregated resource capacity requirements may be viewed as a single RCCR, although it still may be desirable in some cases to impose offsets to further restrict the time during which the RCCR may be scheduled in a planning-level calendar for the aggregated resource.

A RCCR, as is the case with $RCCR_1$ 528, generally may have a time duration associated with it that is shorter than a time period imposed by the rough-cut operation and any offsets. This provides some level of flexibility in scheduling or loading the capacity requirements on the corresponding resources. In some cases, the constraints imposed by the offsets may be tightened or relaxed, dependent on how little time or how much extra time a planner may want to provide to ensure that execution is performed within time frames that are planned.

Figure 6:
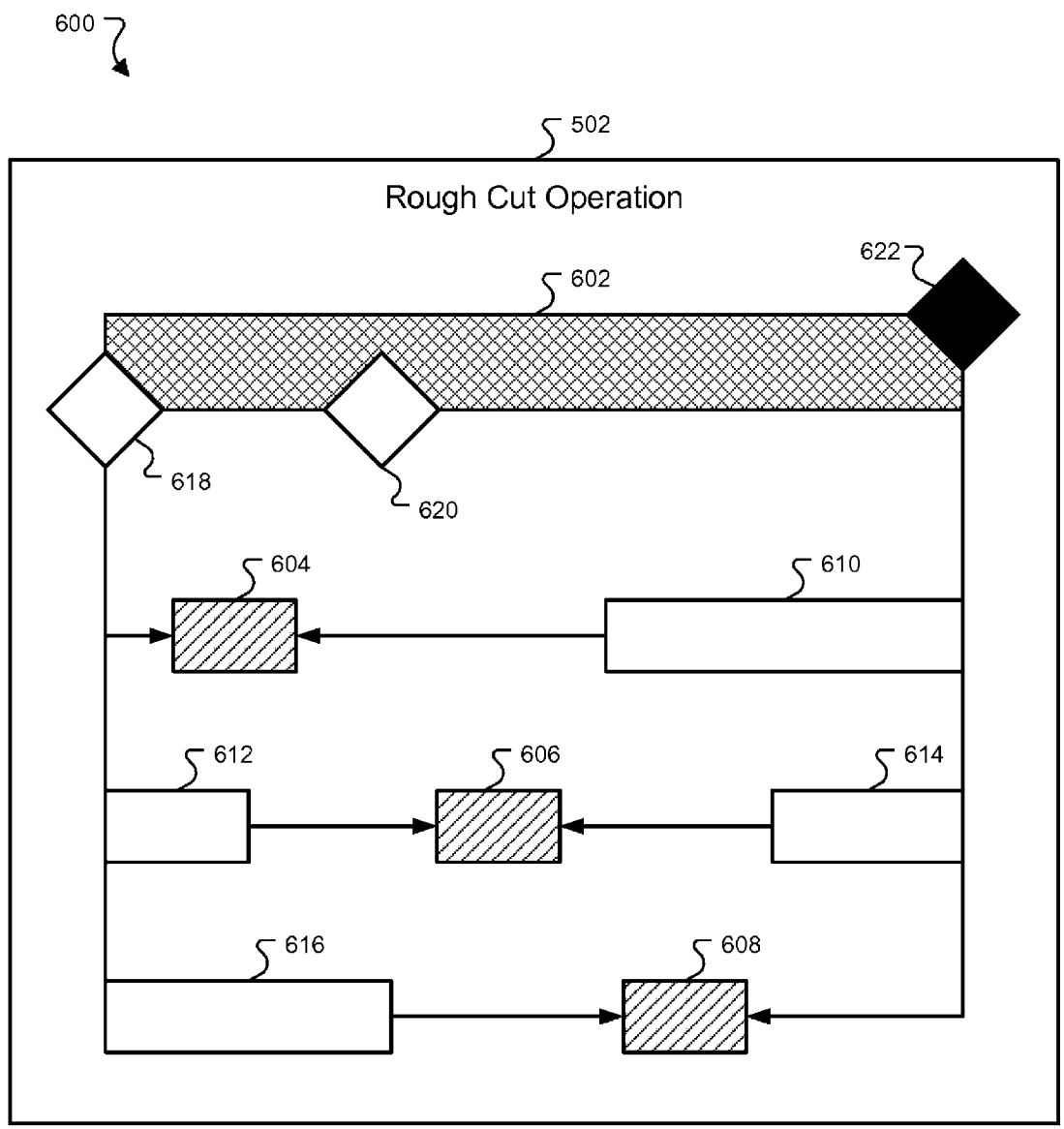
FIG. 6 is a diagram of an exemplary data structure of a rough-cut operation.

Referring now to FIG. 6, an exemplary data structure 600 of the rough-cut operation 502 is shown. Different operations, user selections, and other factors may result in different arrangements of the data structure 600. The rough-cut operation 502 includes a header activity duration 602. The header activity duration 602 represents a planned time that the planning-level operation is expected to take. The duration 602 may comprise a lead time of one or more execution operations that are aggregated in the rough-cut operation 502. For example, in the rough-cut operation 502 shown in FIG. 6, the header activity duration 602 may include the lead time of the operations 512, 514 and 516 shown in FIG. 5. Additional to the processing time of the execution operations, the header activity duration 602 may also include some amount of buffer time. The buffer time provides some amount of time beyond that which is absolutely needed to perform the execution operations.

The rough-cut operation 502 includes RCCRs 604, 606 and 608. The RCCRs 604, 606, 608 may only include the capacity requirements for planning-relevant operations. For example, the RCCR 604 may be modeled in a single requirement that may only include the planning relevant requirements in a setup requirement, a produce requirement, and a teardown requirement of the operation 512. In the depicted embodiment, the RCCRs 604, 606 and 608 are not related to each other. Therefore, there is no time relationship that links the RCCRs 604, 606, 608 together to establish an exact sequence of capacity requirements (similar to the sequence of execution operations for which the capacity is needed). A rough sequential relationship may be established by the aid of offsets.

The rough-cut operation 502 includes offsets 610, 612, 614 and 616 to impose a rough sequential relationship between the RCCRs 604, 606 and 608. The offsets 610, 612, 614 and 616 may specify time relationships between the RCCRs 604, 606 and 608 and the header activity duration 602. In one example, the offset 612 may specify a time relationship between the start of the rough-cut operation 502 and the (from a planning perspective) earliest start of the execution of the operations that cause the RCCR 606. In another example, the offset 614 may specify a time relationship between the end of the operation of the RCCR 606 and the end of the rough-cut operation 502. By adjusting the offsets 610, 612, 614 and 616, the sequential relationships between the RCCRs 604, 606 and 608 may be established. For example, the supply planning module 108 may specify the operation represented by the RCCR 608 to be executed later than the operation represented by the RCCR 606 by specifying the offset 616 to be longer than the offset 612. The offsets 610, 612, 614 and 616 may be automatically set in the routing database 110 (FIG. 1A) and manually adjusted by planning users. A user may decrease the value of the offsets 610, 612, 614 and 616 to increase the chance that the rough-cut operation can be scheduled in time. A user may also increase the value of the offsets 610, 612, 614 and 616 to boost the likelihood of feasibility of the generated plan.

Some rough-cut operations may include one or more input nodes, and/or one or more output nodes. In this example, the rough-cut operation 502 includes two input nodes 618 and 620, and an output node 622. The input nodes 618 and 620 and the output node 622 represent the material inflow and material outflow during the rough-cut operation 502. The input nodes 618 and 620 and the output node 622 are linked to the header activity duration 602 to provide positive or negative offsets in the rough-cut operations 502. Further, in some embodiments, the input nodes 618 and 620 and the output node 622 may provide a link for the rough-cut operation 502 to link with other planning documents (e.g., rough-cut operations in other levels, external procurement proposals, purchase orders), which may include input or output nodes in their structure. For example, a purchase order may include the input node 618. When the supply planning module 108 schedules the rough-cut operation 502 to be executed in a specific time, the processing platform 102 may use to link provided by the input node 618 to find out that the purchase order may also need to be scheduled to provide the required material for the rough-cut operation 502.

Figure 7:
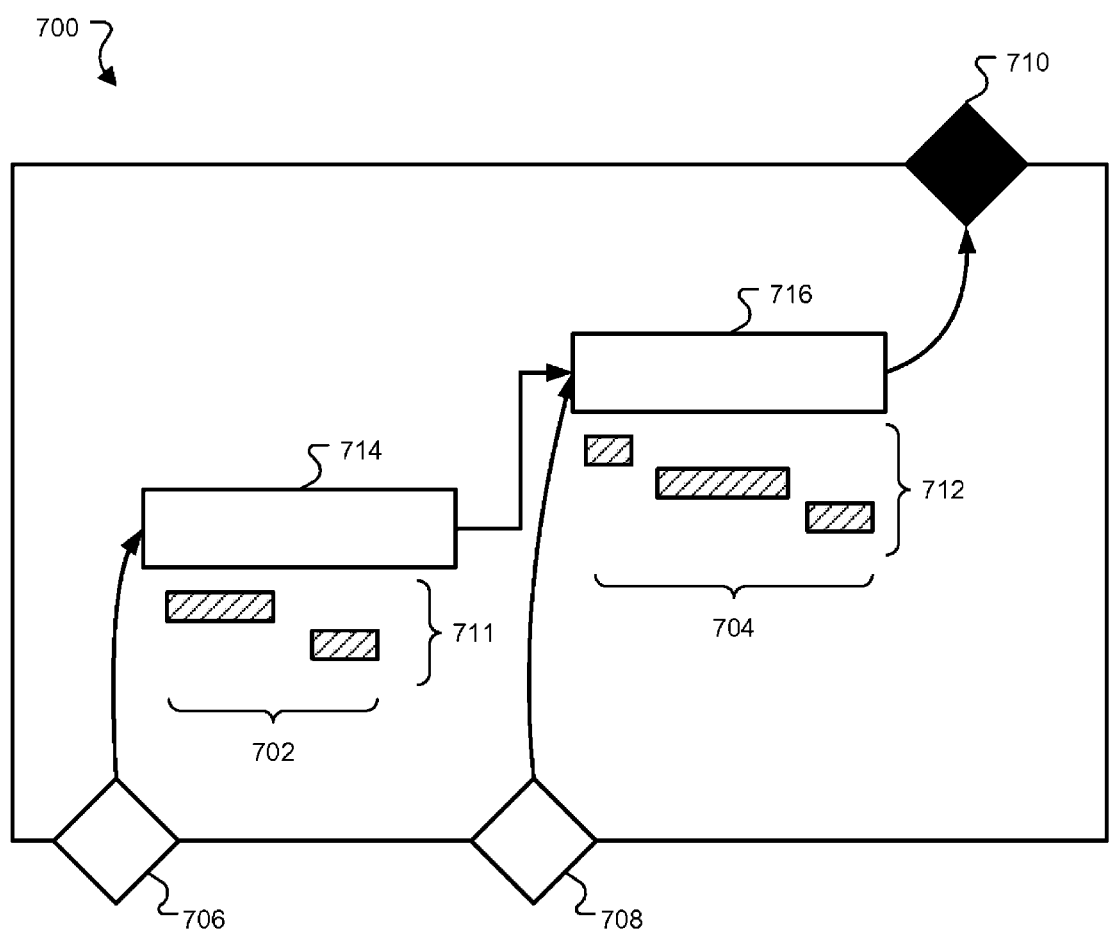
FIG. 7 is a diagram of an exemplary data structure for a planning process model.

FIG. 7 shows an exemplary planned production order 700 that may be generated by the supply planning module 108 during planning operation. In this particular example, the planned production order 700 includes two rough-cut operations 702 and 704. The planned production order 700 also includes input nodes 706 and 708, and an output node 710 that may show the material input and end-product output in the planned production order 700. The rough-cut operations 702 and 704 may include RCCRs 710 and 712, and header activity durations 714 and 716.

In some embodiments, a planning algorithm may generate a timing schedule and a capacity requirement schedule using the information given in the exemplary planned production order 700. Time scheduling of the planning algorithm may work only with the header activity durations 714 and 716. The header activity durations 714 and 716 may represent the durations of the rough-cut operations 702 and 704 as a whole. A planning user or the planning algorithm may perform actions, such as, deletion, rescheduling, mode selection, on the header activity durations 714 and 716. For example, a user may delete a RCCR of a rough-cut operation is the user deems the RCCR to be not planning relevant. In another example, a user may reschedule the header activity duration 714 by rescheduling the occurrence of the rough-cut operation 702. In a further example, a user may change a header activity by selecting different modes in execution operation.

Capacity requirement scheduling of the planning algorithm may be related to the RCCRs 710 and 712. In one implementation, a capacity requirement from a supply planning point of view is a requirement of a production planning order for a resource, such as machine tools or human resources. These resource capacity requirements are derived from the RCCRs. A material requirement is a requirement for raw materials or semi-finished goods, for example. The material requirements are derived or calculated, in this example, from the input nodes of the rough-cut operations. A planning user may not be able to adjust the RCCRs 710 and 712 directly. However, in some embodiments, the actions performed on the header activity durations 714 and 716 may trigger automatic adjustments on the RCCRs 710 and 712. For example, the material requirement schedule related to the RCCRs 710 may change if a user reschedules the rough-cut operation 702. During planning, some rough-cut operations may not be scheduled due to, for example, lack of capacity or other constraints. In this case, in some embodiments, the planning algorithm may automatically reduce buffer time to fit the rough-cut operation into the constraints. While in one implementation a planning user may not be able to break a rough-cut operation into smaller operations for scheduling, a RCCR may, in some implementations, be broken into smaller units for that purpose.

While the data structures shown in the examples of FIGS. 5 to 7 are planning-level manufacturing operations that include an aggregation of a defined group of execution-level manufacturing operations, the same data structures may be used to model execution-level manufacturing operations, execution-level resources, and relationships between execution-level manufacturing operations.

Figure 8:
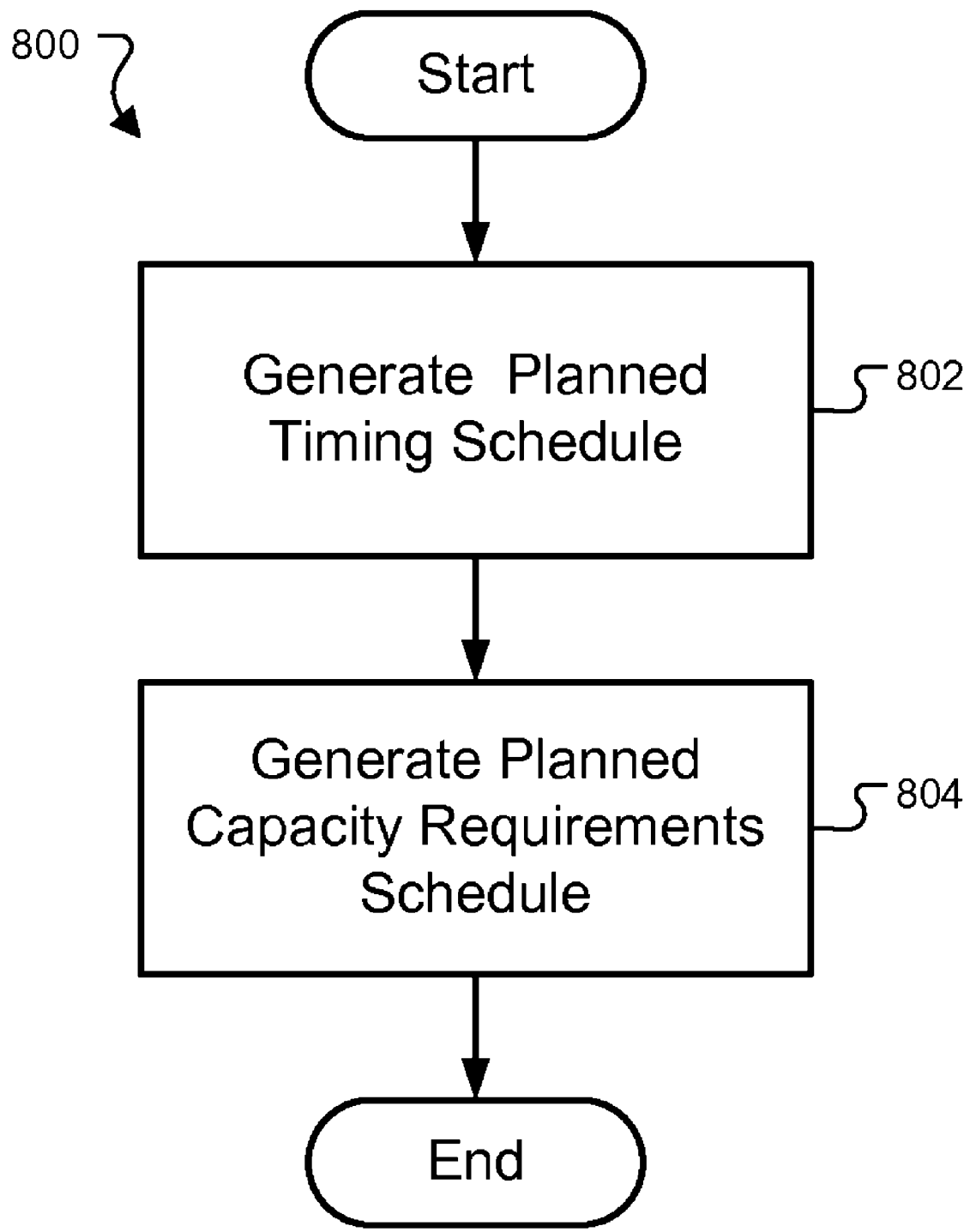
FIG. 8 is a flow chart of a computer-implemented method showing exemplary steps for generating planned production order.

Referring now to FIG. 8, a flow chart is shown that depicts an exemplary method 800 for performing a planning operation for a production process modeled for execution control as multiple separate sequential production operations. The method 800 may be preformed by a manufacturing computing system such as the system 102 in FIG. 1A. In some embodiments, the method 800 may be performed by the system 102 during the execution of the exemplary method 800. In other embodiments, the method 800 may be executed separately when a planning data, such as rough-cut operation routing, demand information, lead-time requirements, capacity requirements, start and end time requirements, and other information, are available. The computing system 102 may then plan and generate a planning document, such as an electronic production order, a purchasing order, or other planning documents, for execution.

In step 802, the method 800 may generate a planned timing schedule for each rough-cut operation to execute a production process to fulfill the received demand information. For example, the method 800 may consider the header activity durations of each of the rough-cut operations in the production process, the timing relationship between the rough-cut operations, and the production capacity of the manufacturing environment 104 to generate a planned timing schedule. In some embodiments, the planning algorithm may use the aggregated duration for each of the rough-cut operations and a manually or automatically selected time relationship between consecutive rough-cut operations to generate the timing schedule.

Separately, the method 800 may, in step 804, generate a planned capacity requirements schedule determined from capacity requirements, such as material requirements or resource requirements, associated with each execution operation and the offset defined for each execution operation. For example, when the method 800 is calculating the material requirements incurred by the rough-cut operation 502, some of the RCCRs 604, 606 and 608 may not contain planning relevant timing information and may be not considered in the timing schedule planning. However, the method 800 may still determine the capacity requirement incurred by the rough-cut operation 502 from the RCCRs 604, 606 and 608 and the offsets 610, 612, 614 and 616. At a later time, the generated timing schedule and the generated capacity requirement may be released to the execution user to perform the production process to fulfill the received demand information, for example, in a production order.

The planned timing schedule generated in step 802 may be a multi-level schedule (for finished products, semi-finished products and raw materials) based on all information (demand, process model, resource calendar which would be a definition of working and non-working times), but in one implementation would not consider the limited capacity supply of the resources (although it would consider the limited supply of materials). The result may be a complete schedule including scheduled material and resource requirements, but resources with limited capacity supply might be overloaded. In this case, the step 804 would then involve a rescheduling of the planned orders in a way that resources with planning-relevant capacity constraints are not overloaded any more (usually leading to a schedule with longer lead times and more late deliveries compared to the result of step 802).

Next, there will be generally described, with the help of FIGS. 9-17, an example and further detail on how execution master data 112 (see FIGS. 1A-D) is processed to create planning master data.

Figure 9:
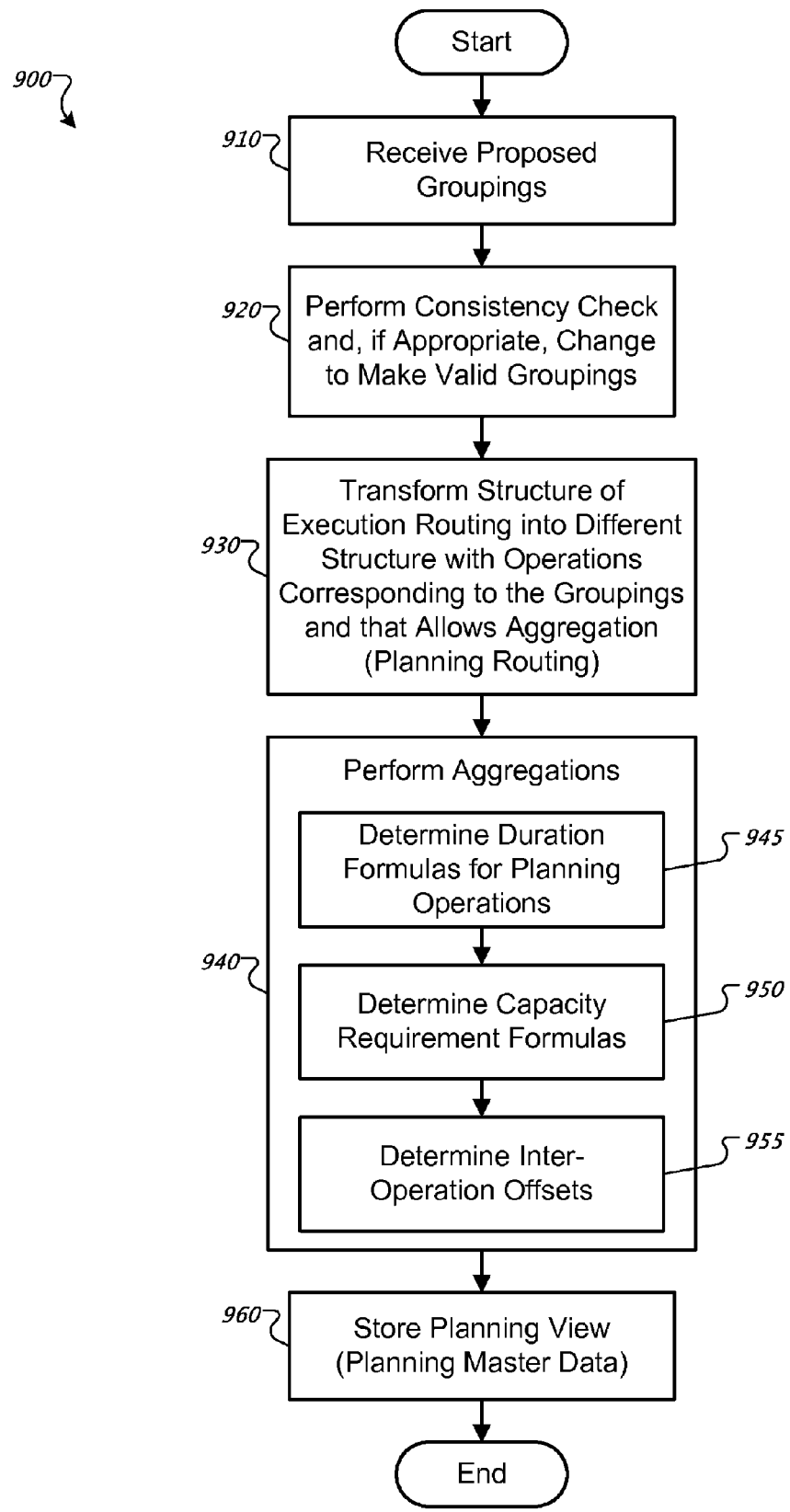
FIG. 9 is flow chart of a computer-implemented method for generating planning master data from execution master data.

Referring first to FIG. 9, there is shown a high-level outline of a computer-implemented method 900 for generating planning master data from execution master data. The method 900 starts with an execution routing (for example, routing 112B—see FIG. 1B), and groupings are defined in that routing, for example, by planning markers as described previously. At step 910, these groupings are received by the system. Then, at step 920, the system performs a consistency check to determine if the grouping are valid groupings that will allow aggregation to be performed. Various rules may be used to determine if the groupings are valid, as will be described in more detail later. If it is determined at step 920 that the groupings are not valid because the groupings fail to meet one or more of the rules, the grouping is changed so that the groupings are valid. This consistency checking process at step 920 ensures that the next steps of the process 900 will work. At this point, there are valid groupings that meet all of the rules that define a valid grouping.

The next step 930 is to transform the structure of the execution routing into a different structure which allows aggregation to be done. The valid groupings determine the structure, as the structure includes planning operations that correspond to the groupings. In other words, each planning operation is made up of all of the process steps that fall within a particular grouping, or in other words, that fall between two planning markers. With respect to the new structure to which the execution routing is being transformed, the structure is made of these planning operations, and all alternatives must be described within a planning operation and by planning operation modes. The main objective here is to transform the structure into one that is a valid input for the aggregation rules that are used later in the method 900. Only when there is a structure that fits into the aggregation mechanism is it possible to perform the aggregation mechanism.

In the structure transformation step 930, one aspect of the step is specific to a planning operation that has multiple planning relevant alternatives, be they planning relevant alternative paths or planning relevant alternative resources. For such an operation, the execution operations that are common to all modes are copied to each mode, and the execution operations that go only in one mode are placed only in the corresponding mode. In other words, there is a process of identifying the paths that go into the planning mode, and then there is a condensing of the paths into one database object for the planning operation. For example, if a planning operation includes an execution sequence that has two execution operations, with the first operation A being a simple operation, and the second operation having alternative execution operations B and C. Then it is identified that A goes into each of two planning modes, and B and C each go into only one of the planning modes. As such, one of the planning modes would be a sequence of two execution operations A and B, and the other planning mode would be a sequence of two execution operations A and C.

Next, at step 940, the system performs the aggregation of the duration and the capacity requirements. In this step 940, the data from all the operations that go into one planning operation (or one planning mode as the case may be) are aggregated is a manner described in more detail later. In this step 940 there is performed numerical aggregations, including durations and capacity requirements. In terms of the numerical aggregations that are performed, there is for each planning operation, at step 945, a duration formula determined for the planning operation. In addition, there are capacity requirement formulas determined at step 950. And finally, there are inter-operation durations determined at step 955. These three determinations are the main parts of the aggregation process.

As for the aggregation processes in step 940, one general goal is to have a linear approximation of the duration measures, or in other words, the formula is to have a linear function versus lot size. To do this, there are fixed and variable components that go into the formula. The main problem that is faced in making any approximation for planning purposes is overlapping. There are two types of overlapping. The first results from set up and tear down activities, because these activities can be done in parallel with production. The second overlapping is send-ahead quantities. It is desirable to have a simple formula achieved by the aggregations, and a linear formula is an example of a simple approximation that is sufficiently useful to solve the problem but is not so accurate so as to not be understood by users. It is important that the approximation be something that is understandable by the planning user. Linear—fixed and variable quantities—are things with which planning users are familiar. This is one reason why a linear approximation was chosen.

Following step 940, the planning master data has now all been generated. As such, at step 940, the generated planning master data is stored (960), for example, in the planning view (or planning master data repository) 114 shown in FIG. 1A. The planning master data then is available to be used in the planning process for individual production orders.

Below, the various processes included in the high-level FIG. 9 method 900 will be described in more detail. First, however, there will be a discussion of the data structures of the execution master data so that a base line is created for understanding the processes that follow. The general structure of the data structures for the execution master data are also used for the planning master data, except that the data structure for the planning master data is simplified and certain structures allowed for the execution master data are not allowed for the planning master data.

Example Execution Master Data Structure:

To describe an example of how planning master data may be generated from execution master data, we will first describe an example data structure for execution master data. As will be appreciated from the discussion below, various features make the execution master data structure particularly well suited in the processing and aggregation processes that create planning master data from the execution master data.

Figure 10:
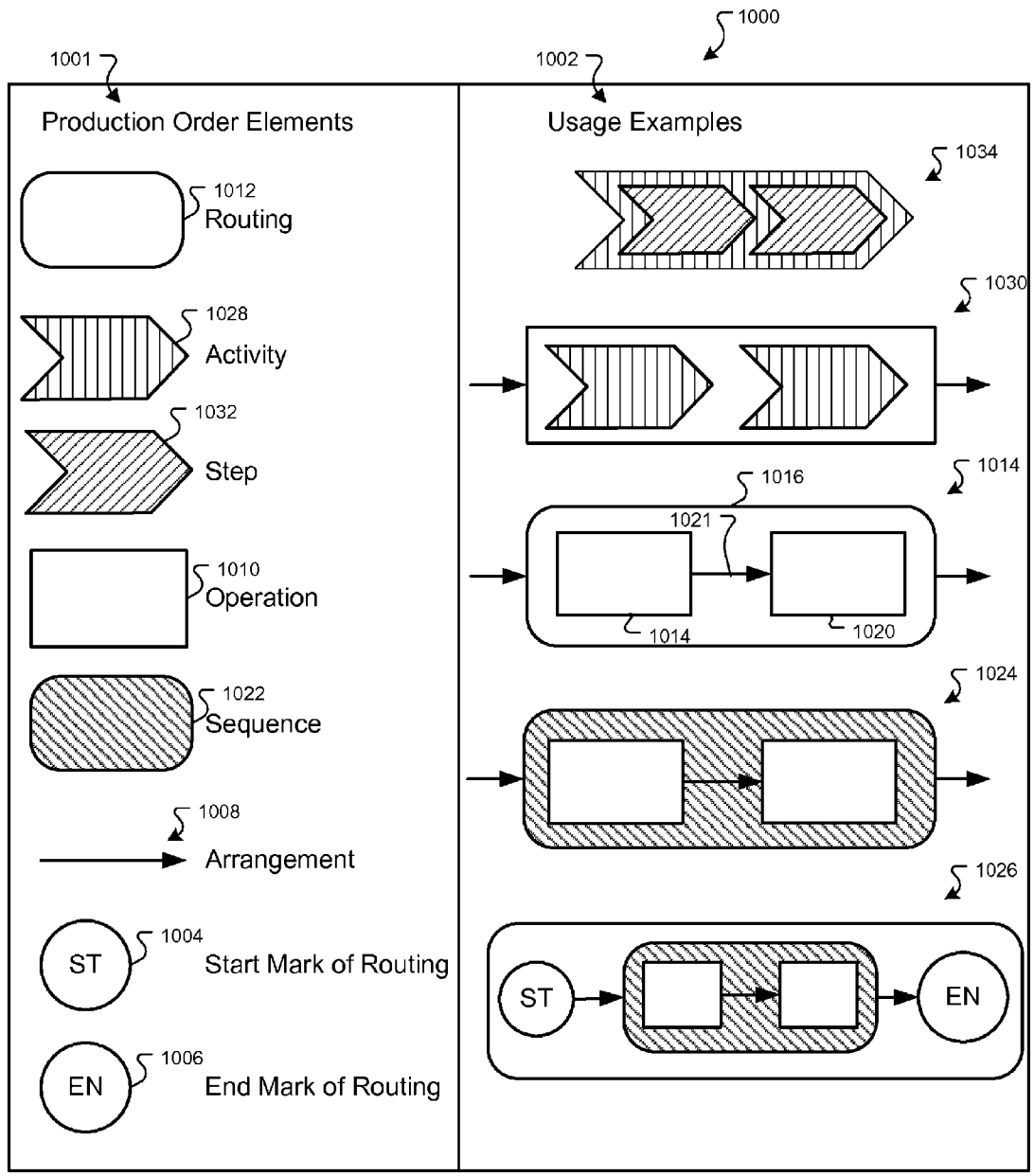
FIG. 10 is a diagram that illustrates production order elements for execution master data, and usage examples for those elements.

Referring to FIG. 10, there is shown various elements of a data structure 1000 for the execution master data. The structure shown in FIG. 10 and subsequent figures may also be referred to as a data model for a production bill of operations. In one implementation, object-oriented programming techniques are used, and a production bill of operations is modeled as a data object that comprises various elements. The data structure 1000 shown in FIG. 10 includes various elements 1001, which are referred to in FIG. 10 as production order elements. In addition, several usage examples 1002 of the production order elements 1000 are also shown in FIG. 10. A process engineer may use the elements as building blocks to design execution master data that models a particular manufacturing process, and do so using a master data management computing module that enables the creation and maintenance of the master data.

In one implementation, the general structure of a production bill of operations (PBoO) is a hierarchical structure with different levels. At the top of this hierarchy, a header object (or element) is located. This object may uniquely identify a particular PBoO, and it may serve as a header or leading object of a complete process description. The header may combine all of the elements of a PBoO to enable access to them all. In addition, the header may represent the main sequence of a PBoO, which may, by default, be a strict linear sequence of other elements. The header may include a general base quantity and base quantity unit for a PBoO. This may be done to set a base for target times and capacity requirements at operations, as will be described later.

The main sequence of a PBoO may be given by a start marker 1004 and an end marker 1006, which defines the start and the end of the main production process that produces the master end product. In one implementation, only one start and end marker is possible in a PBoO; this allows the main production sequence to be clearly defined. Start and end markers may, as describe previously, be generated automatically after a PBoO header definition is created. Both markers 1004 and 1006 may be linked together by an arrangement relation. Other PBoO elements may then be placed between the start and end markers.

The start marker 1004 and end marker 1006 may be created by default during the process of creating the master data for the particular manufacturing process. Both markers (and more generally, production order elements) are linked together by an arrangement element 1008 with other production order elements. The arrangement element 1008 defines the logical arrangement of production order elements to produce a product in the right order and determines the material flow in production. In some embodiments, the arrangement element 1008 may be defined by default during the process of creating the execution master data. The arrangement element 1008 may impose a strict relationship between the orders of execution between the production order elements. For example, the arrangement element 1008 may impose a strict predecessor-successor relationship that only linear relations may be made between production order elements and no recursive linking is allowed.

A routing element 1012, in this example, is the overall description of the manufacturing process, with all of the manufacturing steps to transform one or more input materials to one or more end products. The routing element 1012 specifies all of the needed resources, materials, and instructions for the manufacturing process. The routing element 1012 may include multiple operations 1010 and may represent a linear sequence of activities to be processed on a main resource that is the subject of the routing 1012. The arrangement element 1008 may define an order of execution of operations included in a routing 1012. For example, a usage example 1014 shows a routing 1016 that includes two operations 1018 and 1020. The second operation 1020 may be executed after the first operation 1018, which may be defined by an arrangement element 1021.

An operation 1010 describes an enclosed and single transformation process of master quantity flow at a special resource within the whole production process described by the routing 1012. An operation 1010 may group and represent a linear sequence of activities 1028, which will be processed on the same main resource. As such, an operation 1010 definition may depend on the main resource where, or by which, the operation occurs. The start and end of an operation may be defined by the first and the last activity 1028 of an activity sequence. Operations 1010 may be linked together directly.

A sequence 1022 may group operations 1010 that belong logically together, as shown in a usage example 1024, which includes two operations in sequence. If a manufacturing process being modeled includes many operations 1010, the sequence 1022 may help divide the manufacturing process into different logical segments. The logical segments defined by the sequence 1022 element may improve recognition, searching, and reusing production order elements. In addition, the sequence element 1022 may be useful in modeling more complicated manufacturing processes, which may have parallel sequences or alternative sequences, as will be described later. Additionally, modeling execution master data with appropriate groupings of logical segments may help administrative users, such as a supervisor or a manager, to create areas of responsibility in the production operation. A simple example that includes the start marker 1004, the end marker 1006, arrangement elements 1008, operations 1010, the routing 1012, and the sequence 1022 is shown in a usage example 1026.

The activity element 1028 may represent the elementary actions that are necessary to process and plan a single manufacturing step at the resource, in connection with other activities. In this implementation, an activity is always part of an operation and may be the only activity in the operation or may be a part of a linear sequence of activities. A usage example 1030 shows an example of an operation that includes two activities in sequence. Activities may also have different types that specify their purpose in the production process. The type definition may, as will be explained later, be used in duration and timing calculations. Example types may be setup, production, teardown, preparation, quality check, parameter determination, etc. Every activity may have its own additional resource requirement.

A step element 1032 may be a smaller part of an activity, and provide a more detailed description for execution purposes. Step elements 1032 may give information for production task generation and define user interface views used by operators during the manufacturing process. The activity element 1028 may include a single step 1032 or a linear sequence of multiple steps 1032. For example, a usage example 1034 shows an activity element 1028 that is made up of two step elements 1032 in sequence. The step element 1032 may link to additional execution relevant information that may have no impact on production planning.

All of the above-mentioned elements are, in one implementation, connected to linear sequences of elements only. This connection may be made with an arrangement 1008. The arrangement 1008 defines the logical arrangement of elements to produce a product in the right order, and therefore determines the material flow in production. In general, the arrangement 1008 may be an element that is maintained implicitly by means of a definition provided with a user tool to create a PBoO. In addition, an arrangement, in one example, has a strict predecessor-successor relationship between PBoO elements without any attributes and without a change state. In this example, only linear relations may be made with this arrangement element, and of course a recursive linkage would not be possible.

Also, what may be referred to as technical elements may be defined below activity elements 1028. For example, the technical element may specify that only linear sequences of steps are definable. The technical element may also, for example, be a holder of assigned instructions, documents and links, process parameters, measurement points, and a user interface connection.

Branching and Connection Structures

Figure 11:
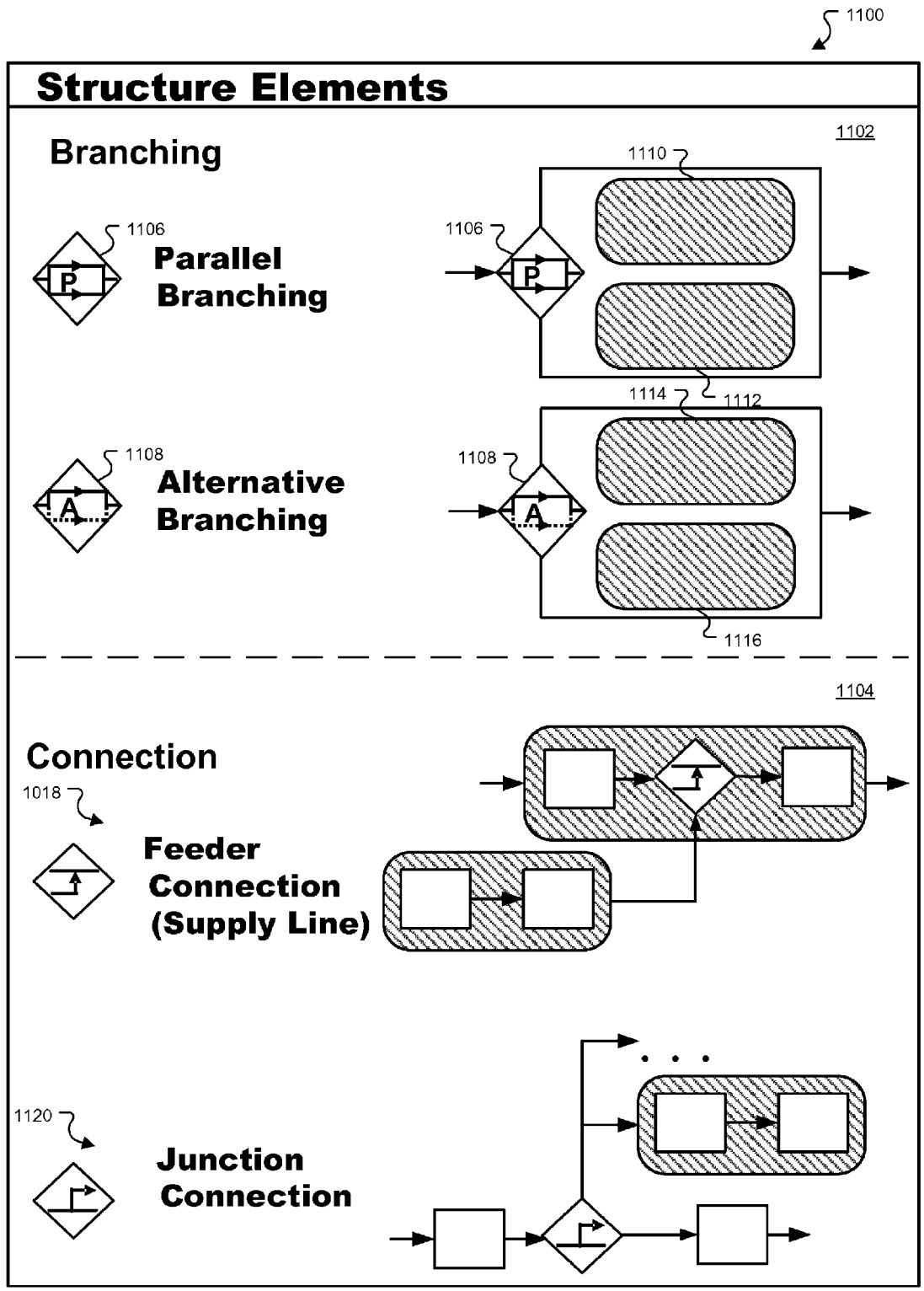
FIG. 11 is a diagram that illustrates structure elements for execution master data.

Referring to FIG. 11, there is shown an exemplary set of structure elements 1100 that may also be used as building blocks of manufacturing process execution master data. The structure elements 1100 shown in FIG. 11 realize branching and connection structures for the manufacturing process master data. These elements 1100 help to integrate additional sequences into the main production sequence that do not follow the paradigm of linear arrangement. Two types of structure elements, branching elements 1102 and connection elements 1104, are included in FIG. 11.

Branching elements 1102 may be used when a production order includes parallel sequences of operations or alternative sequences of operations. As one example, there may be two machines configured to perform two different processes simultaneously, or in other words, in parallel. As another example, there may be two alternative machines configured to perform the same process but they have different operating characteristics, such as different duration requirements with respect to lot size. Also, one alternative may be faster than another at large lot sizes, but slower at smaller lot sizes.

The branching elements 1102 include a parallel branching element 1106 and an alternative branching element 1108, each of which may be associated with an operation element 910 that includes two sequence elements 922. The parallel branching element 1106 integrates parallel sequences 1110 and 1112. The parallel branching 1106 may be used when, for example, the sequences 1110 and 1112 included in an operation may be processed simultaneously, or in parallel. The alternative branching element 1108 integrates alternative sequences 1114 and 1116 that make up an operation. The alternative branching element 1108 may be used when, for example, only one, but not both, of the two sequences 1114 and 1116 included in the operation are needed in the manufacturing process.

As with alternative sequences, a definition of an identifier for each of the parallel sequences may be needed for differentiation. (Also, parallel sequences may validly contain other parallel sequences. Any number of parallels and couplings can validly be maintained within a parallel branching. Also, alternative branchings may validly be maintained within a parallel sequence.)

Two types of alternative branchings may be defined. The first is an "exclusive or" alternative branching, which requires that one and only one of the alternatives be used for a production order. A simple "or" type alternative branching does not require this, and, for example, allows lot splitting such that some product of a production order are produced using one alternative, while others are produced using the other alternative.

Parallel sequences represent, in contrast to alternatives, only a common material quantity flow in production. That means there is no lot size split possible, and every path follows a different production process and addresses the same lot size. This modeling is mainly offered to reduce the load time in processing, for example, by using multiple workers on the same line and at the same time. Material split is therefore not defined by parallel sequences. In some implementations, however, material split may be supported.

Connection elements 1104 may be used when execution master data needs to include connections that occur within a sequence or from between two operations in a sequence, for example. The example connection elements 1104 shown in FIG. 11 include a feeder connection 1118 and a junction connection 1120. The feeder connection 1118 may illustrate, for example, a material input, such as a supply of material, during the material flow of a production process. For example, material may be produced as an output of a first sequence element that feeds into, as defined by a feeder connection element, an intermediate point within a second sequence element. The junction connection 1120 may illustrate, for example, a supply of material into different sequences. For example, material may be produced as an output from one of multiple operations in a sequence, and that material output may be provided to, by way of the junction connection 1120, a sequence of multiple operations.

Attributes of an Operation Element

As will be appreciated later, the structure of an operation is an important aspect in understanding the aggregation process. First, the execution operation structure is used for planning operations, albeit simplified somewhat and additional restrictions applied, as will be described later. In addition, it is from the operation structure that various attributes are obtained that are aggregated. As such, it makes sense to describe in some detail an example data structure for an operation element.

1. Main Resource Assignment:

Resource assignment is made for PBoOs to define the resources at the factory at which the work defined in PBoO is to be processed. This is done, in one implementation, at the operation level. If a resource is defined for an operation element, then the resource is specified as a main resource for the whole operation. That means that every activity below the operation will be carried out on this main resource also, although the activity may also have additional resource requirements associated with it. The connection between the main resource for an operation and for an activity may be virtual and not physical. In one implementation, a main resource definition at the operation level is mandatory.

2. Base Quantity:

An operation can have its own base quantity and unit. If this is different from the reference quantity or unit defined for the PBoO header, then a ratio of both may be determined and used as a conversion factor. This conversion factor describes the relation between the master output of the PBoO and a master quantity flow which appears at the end of an operation in the PBoO, and can be used to define a change of quantity or units in the PBoO. For example, 6 Bottles=1 crate may have the meaning that 6 bottles are needed at a particular operation to produce 1 crate as an end product. A base quantity definition is generally made for an "ideal" production process without considering scrap. Reference quantities and the unit for the last operation in a PboO must match that defined in the header for the PBoO. A definition of a base quantity at the operation level may be optional; if nothing is defined at the operation level, then a base quantity for PBoO as defined in the header will be taken into account for the operation.

3. Send-ahead Quantities:

Send ahead quantities are used to describe overlapping of operations. Overlapping is used to allow reducing the lead time in scheduling and execution by creating sub-lot sizes that can be processed by successive operations simultaneously. A lot size split may be defined by the send-ahead quantity, and may define which already-processed quantity of a production lot can be handed over from the current operation to a following operation. Therefore, it is desirable in many cases to have the send-ahead quantity always be an attribute of the operation. This attribute is typically relevant for planning, execution and transportation. Especially in scheduling, the send-ahead quantity may be the basis for an offset calculation, as will be described later.

Send-ahead quantities and quantity units are related to the master quantity flow, which is defined either by the base quantities in the PBoO (header) or directly at the operation. If a send-ahead quantity is entered at the last operation of a PBoO, then this value is typically not used in planning and execution processes.

4. Inter-operation Duration:

Inter-operation duration is a flexible attribute that may be defined for the operation and describes a fixed time buffer between, for example, the end of the operation where it is defined and the start of the following operation. This buffer time can account for different things, for example:
1) A required wait time which describes a fixed technical or process-dependent waiting time at the end of an operation. This can be used to define, for example, cooling down times, ripening, and so on.
2) A transportation time which is needed to transport material from one resource to another one.
3) A waiting time for an order at a special resource.
4) Quality inspection times.

All described usages are always part of the material flow and are independent from tear-down or setup activities. For scheduling aspects, another attribute may be used which defines which calendar is used for scheduling this transition time. There are two possibilities:
1) Use of a factory calendar which is defined in a factory layout database. This setting may be needed, for example, to account for transportation time.
2) Use of a Gregorian calendar, which means buffer time does not depend on a factory calendar. This setting may be needed for definition of a required wait time.

Attributes of an Activity Element

1. Activity Type:

In one implementation, every activity must have an assigned activity type. There may be pre-defined types of activities that specify the purpose of the activity in the production process. Example types for activities are setup, production, and tear down, which are relevant for planning and execution.

2. Additional Resource Assignment:

An activity can have its own defined resource requirement, in addition to the main resource assignment for the operation of which the activity is a part. If a resource is defined at the activity level, then the resource is an additional resource for the activity. In such a case, the resource is only used by this special activity so long as no other activity uses the same resource as an additional resource also. Several additional resources can be defined at an activity. In this case, all of these resources may be needed to fulfil the work described at the activity.

Resource Assignment

Resource assignment is used for PBoOs, and this defines at which resources in a factory the work defined in PBoO is to be processed. In addition, resource assignment may serve as a basis for scheduling, capacity planning, and cost calculation.

Resources are generally defined in separate master data, which may be referred to as a production bill of operations (resource element), which can be referenced by the PBoOs. There are two locations where a resource can be defined in a PBoO, at the operation level and at the activity level. Depending on this the assigned resource has a different semantic. If a resource is defined at an operation level, then this resource is specified as a main resource for the whole operation. That means every activity below this operation will be carried out on this main resource without any exception. The connection between main resource and activity may be only virtual not physical. If a resource is defined at an activity, then this resource is an additional resource for the activity. This resource is only used by this special activity as long as no other activity uses the same resource as an additional resource also. Several additional resources can be defined at an activity. In such a case, all of the resources are needed to fulfill the work described at the activity. It is not necessary to define a resource as a main resource at an operation and as an additional resource at an activity of the same operation. As such, duplicate resource assignment at the activity level may be forbidden.

Main resource definition at the operation level is always mandatory, in one implementation. Additional resources that are needed for all activities of an operation can not be assigned to the operation like the main resource. In this case, the additional resource must be defined at every single activity.

Different main resources at an operation can be maintained. But these resources have the meaning of alternative resources for the operations. Alternative main resources define interchangeable resources that can carry out the same operation. One resource of these alternatives may be defined as a default resource for production order creation.

The definition of additional resources is not dependent on alternative main resources. Every selected main resource has to use the additional resource defined at activities. Alternative additional resources can not be specified at all. If an additional resource is not needed by at least one main resource defined at an operation, or if the structure of activities should be different or target times or steps are resource specific, then a new operation is defined for this special main resource. Finally, a multiple main resource assignment is only feasible if the whole process description for an operation defined by activity structure and parameters is the same for all of these resources.

Selection of alternative resources may happen in planning or in execution, and can be made by availability. If no other resource is selected at production order generation, then the default resource may be taken. In contrast to alternative sequences, which allow "simple or" relations in execution, alternative resources may be restricted to a pure "exclusive or" relation. That means an operation can only be processed by one alternative main resource in a production order.

Some restrictions may be desirable regarding alternative resource definition. For example, in alternative sequences with more than one operation the assignment of an alternative resource may not be allowed if the alternative resources belong to different planning resources. This may be needed to prevent a non-symmetrical planning activity structure.

Component Assignment

Components are the items in a bill of materials for a product that are included in the final product produced by the manufacturing process. The components identified in a bill of material may have a hierarchical structure, with several lower-level components forming a higher-level component. Components from a bill of materials for a product are assigned as either inputs or outputs, or both, in a production bill of operations (PBoO).

A component assignment shows, in a PBoO, at which activity a component is consumed or will appear as product in the production process. Therefore, two kinds of assignments shall be supported. The first kind of assignment is an input assignment which defines which components are needed in the production process to produce an end product properly. The second type describes the outcome of a production process. Therefore this is named as output assignment. An assignment combines an element of a bill of material with an element of the PBoO. In one implementation, a component assignment shall only be possible to an activity of the type "production." Other types of activities are not supported for component assignment because these are not part of the material quantity flow in production process. Hand tools and auxiliary supplies, which never will be part of the material flow and which could be useful for setup or tear down activities as input components, are not part of a bill of operations.

Co/By-Product Definition and Assignment

Co- and by-products are items produced during a manufacturing process but that are not part of the final product and thus not included in the bill of material for the product. Co/By-products may be maintained as output components of production activities. A Co or By-product is an ordinary product which is defined in the product master and which is referenced by a production activity in a production segment.

To distinguish between Co-products and By-product, a simple rule is sufficient. Co-products are maintained if concrete quantities are defined. By-products are defined if no quantity declaration is made. In addition, By-products can only appear in the production process without having an own production path. That means that a By-product can never be an end product of a branched production path. In other words the result of a branched production path must always be a Co-product with a defined output quantity.

Generation of Planning Master Data

1. Grouping Consistency Checking and Repair:

Previously in this application, the process for a user to perform a grouping to define planning operations was described. In addition, it has been described that in some cases planning operations are not defined by a user, but instead are either determined by default, for example, the start and end markers may be the only planning marker, and the entire execution routing is to be aggregated, if possible, into a single planning structure. Referring to FIG. 9, the consistency checking and repair process 920 was generally referenced, and in FIG. 12, the details of that process are shown and will now be described. As mentioned, in step 910 (in both FIGS. 9 and 12), proposed groupings are received. These may be user defined markers, in conjunction with start and end markers, which together define proposed groupings. While the process is described with the use of markers defining the groupings, groupings may alternatively be defined by some other mechanism.

Figure 12:
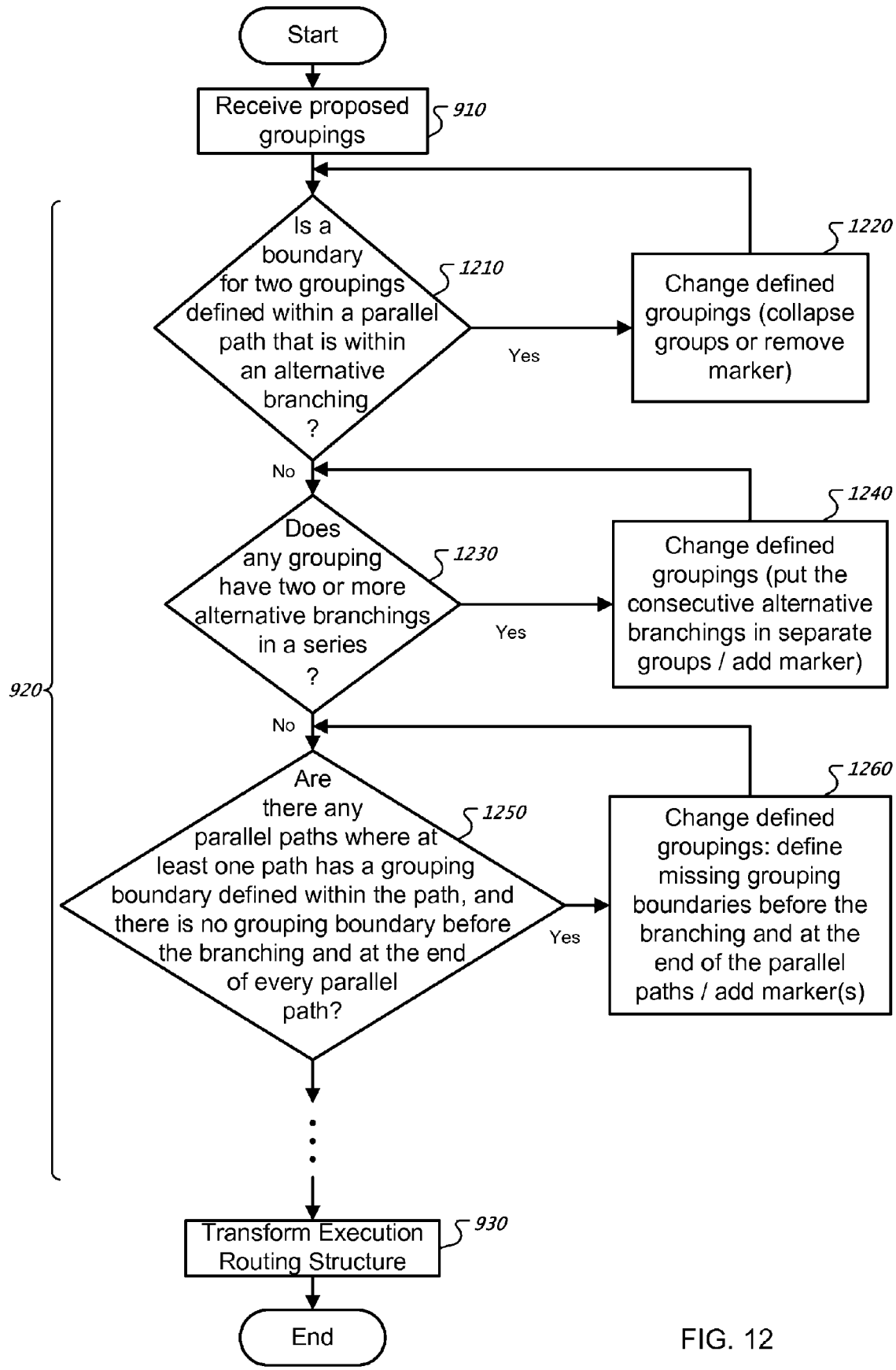
FIG. 12 is a flow chart of a computer-implemented method for performing a consistency checking and repair process.

Referring to FIG. 12, at step 1210, a consistency check is made that uses the following rule. Where there are parallel paths below an alternative path, there can be no planning markers set within any of the parallel paths. If a user attempts to set a planning marker within one of the parallel paths of a parallel branching that is below, or within, an alternative branching, then that planning marker is detected in the consistency checking process. Then, in a change or repair step 1220, the planning marker is removed and the proposed grouping is changed.

Figure 13A:
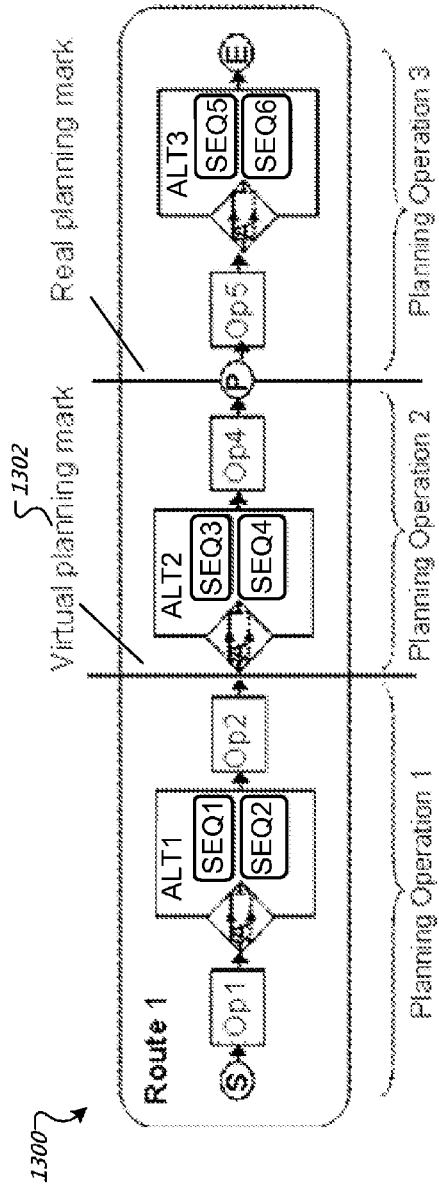
FIGS. 13A-C are diagrams illustrating routings for which a consistency checking and repair process is being performed.
Figure 13B:
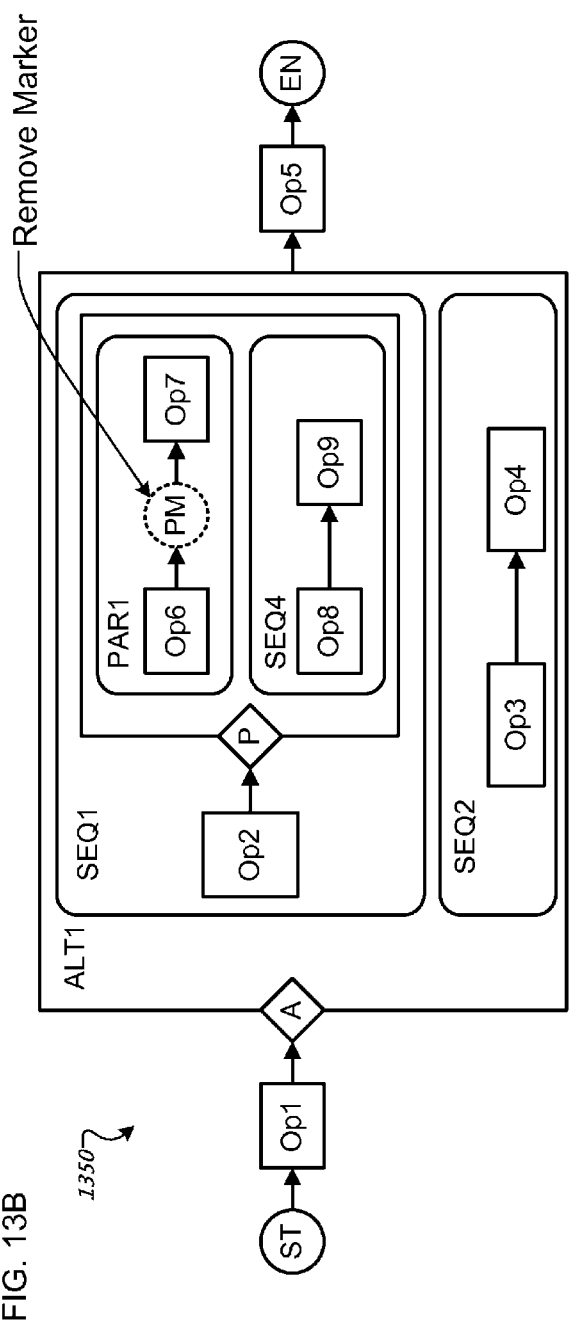

An example of an invalidly placed marker can be seen in a routing 1350 shown in FIG. 13B. Here, the routing 1350 has an alternative branching Alt 1 with two sequences, SEQ 1 and SEQ 2. In SEQ 1, there is an operation Op2 followed by a parallel branching PAR 1 with two sequences SEQ 3 and SEQ 4. The first sequence SEQ 3 of the parallel branching consists of two operations, Op6 and Op7, and there is a marker placed between these two operations. The second sequence SEQ 4 of the parallel branching does not, however, have a marker placed within it. The placement of the planning marker PM between Op6 and Op7 within one of the parallel paths violates the rule against markers being placed within any parallel path within an alternative branching.

One reason why this consistency check is useful is that it is desirable to have a simple planning model. Allowing a planning marker to be placed within a parallel path of a parallel branching that is below an alternative branching would require an operation to be defined within a planning mode of an operation, which for the sake of simplicity of the model and hence having a structure that is able to be aggregated, is not permitted.

Referring back to FIG. 12, at step 1230, it is checked whether any of the defined proposed groupings has two or more alternatives in a series. The alternatives, as discussed previously, may be alternative paths or alternative planning relevant resources that are not aggregated to the same planning resource. An example a structure with a series of alternative branchings is shown in a routing 1300 shown in FIG. 13A. If several alternative branchings are defined in a row between two planning markers (for example, start marker S and planning marker P in FIG. 13A), then every alternative must be finished with its own planning marker. If this is not the case, then virtual planning markers may be used and will lead to a correct generation of a planning view. A virtual planning marker is used if an alternative branching is located directly behind another alternative branching and there is no planning marker defined between these two. In this case, a virtual planning marker will be used at the start of the second alternative branching to generate the planning view properly. This virtual planning marker need not lead to a generation of a planning marker in the execution view of a bill of operation, and so may not be saved because in such a case it will only be a logical element. It leads only to a generation of a planning operation in the planning view of a production bill of operation.

In FIG. 13A, between alternative branching 'Alt 1' and 'Alt 2', no planning marker is defined. In this case a virtual planning marker 1302 will be considered for planning view generation. This is not necessary for the alternative branching 'Alt 3' because between 'Alt 2' and 'Alt 3' a real planning marker P is defined, which can be taken into account for planning view generation.

A single operation with alternative main resources is synonymous with an alternative operation if the assigned alternative main resources belong to different planning resources. In this case, a planning marker behind and in front of the operation may be needed. This may need to be checked for all possible change states of operation because in some implementations the main resource definition can change. If no planning marker is set, then in the planning view generation markers will be assumed as set and only a warning message may be shown.

Referring back to FIG. 12 now, at step 1240, a change in the defined groupings is made. This may be the addition of a virtual marker, which in one implementation is not placed into the execution routing, but rather is noted virtually. The consistency check may be integrated into the transformation process (step 930, FIG. 9), such that the transformation process 930 assumes a marker between alternative branchings even though no marker is defined in the execution master data.

Alternatively, the change, or repair, step 1240 may be done by the system proposing, on a user interface of a modeling tool for example, an additional marker to a user. The user may either select the marker at the location proposed, or may alternatively decide to reject the placement of the proposed marker and place the marker at another valid location. Either way, the groupings can be considered to have been changed from that originally set forth in the execution master data.

Next, at step 1250, a rule is employed such that, if parallel sequences are desired to be visible in planning, then planning markers must be set at the end of each parallel sequence, and a planning marker must also be set at the beginning of the parallel branching. As such, at step 1250, it is checked whether there are any parallel paths where at least one of the parallel paths has a grouping boundary defined within the path, and there is no grouping boundary before the branching and at the end of every parallel path. If so, then processing proceeds to step 1260, where a grouping boundary (for example, a marker) is defined before the parallel branching and at the end of each of the parallel paths, and thus the proposed groupings are changed. If not, then processing proceeds through any further consistency checks and repairs, as indicated by the dotted line in the flow chart, and eventually proceeds to the step 930 (see also FIG. 9), where the execution routing structure is transformed into the planning routing structure.

Figure 13C:
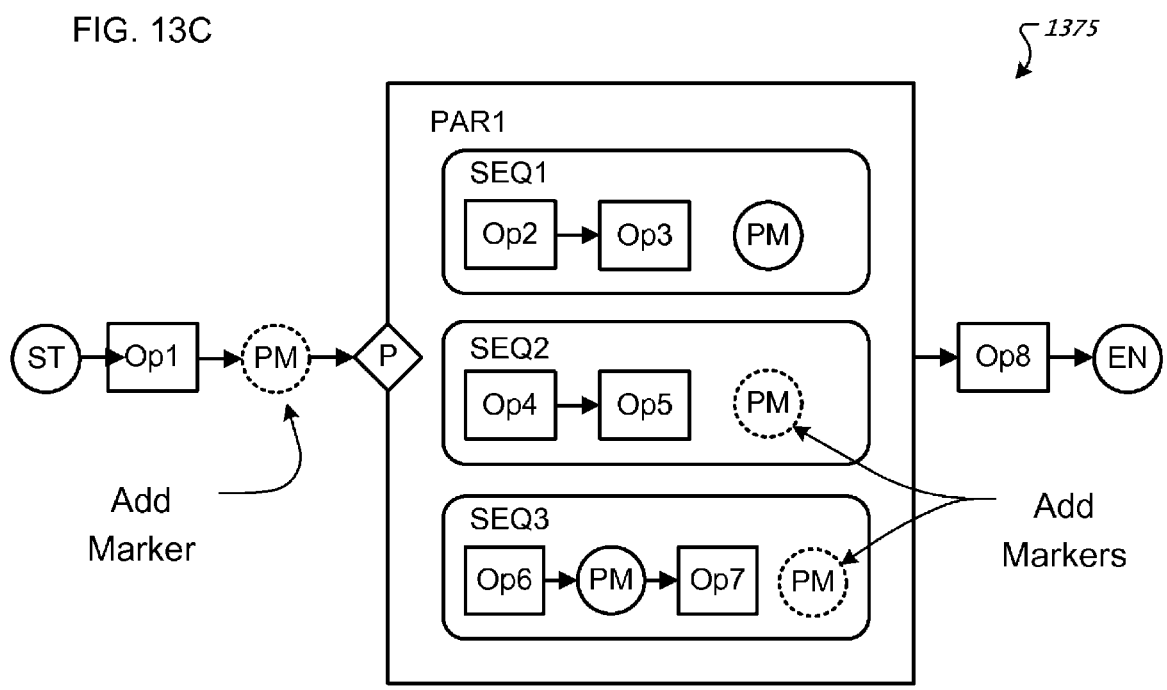

An example of a situation relating to the check of step 1250 may be seen in FIG. 13C, which shows a routing 1375 that includes, in sequence between a start marker ST and an end marker EN, a simple operation Op1, a parallel branching PAR1, and another simple operation Op8. The parallel branching includes three parallel sequences SEQ1, SEQ2, and SEQ3 that each have two operations. In the first sequence SEQ1, a planning marker PM has been set by a user after the last operation Op3 in the sequence, as indicated by a solid line around the marker PM. In addition, a planning marker has also been set within the last parallel sequence SEQ3, between the two operations Op6 and Op7. The user did not, however, also set planning markers at the end of the second and third parallel sequences SEQ2 and SEQ3, and did not also set a planning marker before the parallel branching PAR1. As such, planning markers PM are added, as indicated in FIG. 13C, at the end of the second sequence SEQ2, at the end of the third sequence SEQ3, and before the parallel branching PAR1. As will be described later, if parallel sequences are maintained, then every parallel sequence is represented by a planning operation with a mode which defines its own lead time and which collect all the capacities of the parallel sequence.

Figure 14:
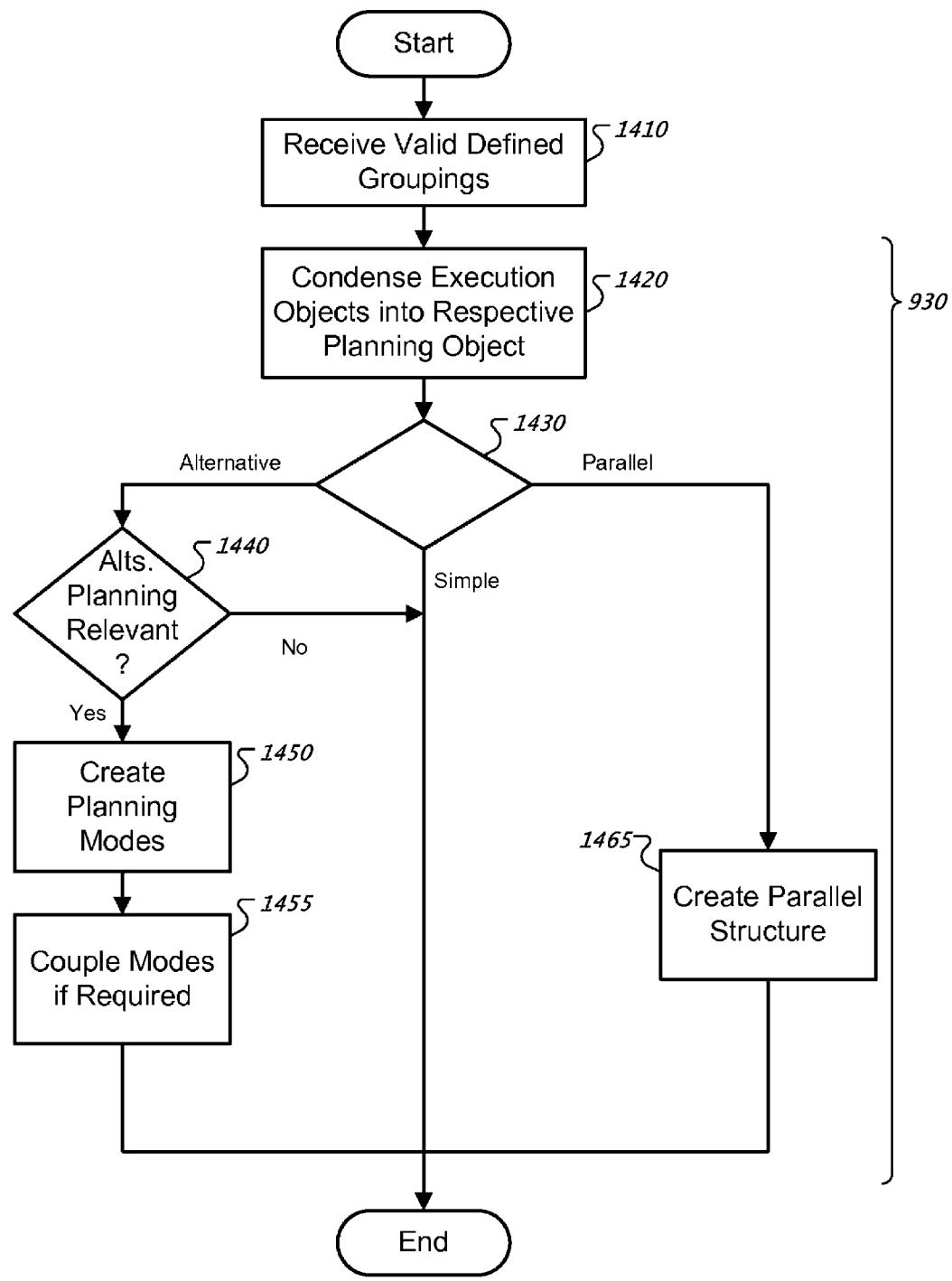
FIG. 14 is a flow chart of a computer-implemented method for performing a transformation of an execution routing into a planning routing.

2. Structural Transformation:

The next step 930, shown in detail in FIG. 14, is to transform the structure of the execution routing into a different structure which allows aggregation to be done. The process begins with the receipt of validly defined groupings, at step 1410. This may be the output of the consistency checking process 920 (FIG. 9, and also shown in FIG. 12). The valid groupings determine the structure, as the structure includes planning operations that correspond to the groupings.

The first step 1420 in the structural transformation method 930 is to condense execution operation objects into their respective planning operation object. For example, if each execution operation is represented by a database object, then that object data is structured to be part of a planning database object being created. For example, referring to FIG. 5, where a planning marker 508 forms two groups. Operations 1-3 are condensed into one planning operation, and operations 4-5 are condensed into a second planning operation.

Next, at decision step 1430, there is different treatment given to the structural transformation process depending whether the planning operation is of an alternative type, a parallel type, or a simple type (meaning neither alternative nor parallel).

2.a. Planning Operations with Alternative Branchings:

For planning operations that are of the alternative type, this means that a sequence of operations (or only one operation) has an alternative, be it an alternative path or alternative resources that are part of different planning resources. For alternative type planning operations, the first thing that may be checked, at step 1440, although this process may have been determined earlier, checks whether the alternative type operation is indeed an alternative type operation. If for example, an execution operation has alternative resources defined for it, but both of the resources belong to the same planning resource, then the alternative collapses, and the operation is not considered an alternative type, and so the operation is treated like any other simple operation.

Figure 15A:
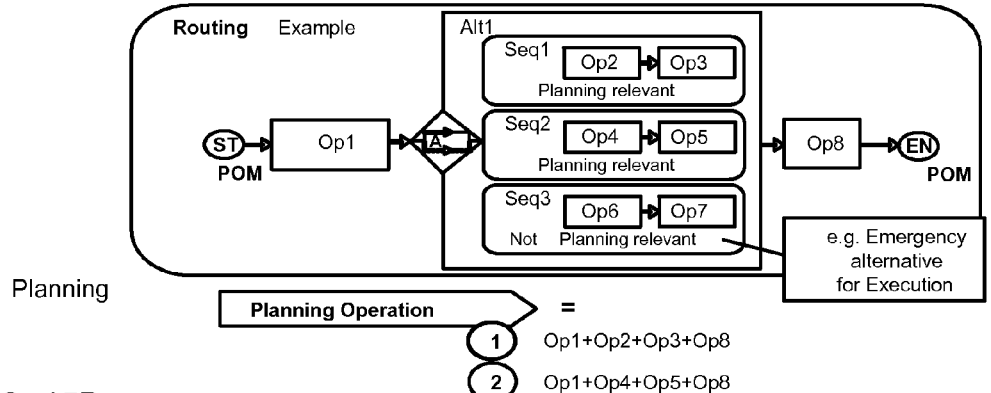
FIGS. 15A-C are diagrams illustrating routings that demonstrate characteristics being described in connection with FIG. 14.

If the alternative operation is indeed an alternative type, then, at step 1450, separate planning modes are created for each of the alternatives. This may be understood with reference to FIG. 15A. FIG. 15A shows an example routing 1500 that has an alternative branching Alt I with three alternative sequences Seq1, Seq2 and Seq3. Before and after the alternative branching are additional operations, with operation Op 1 before the alternative branching and operation Op8 after. A planning operation is defined by start marker ST and end marker EN, as indicated by the POM (planning operation marker) indicator on FIG. 15A. Although the alternative branching has three alternatives, one of them—namely, sequence Seq3—is identified as being not planning relevant, and so this sequence is disregarded, or filtered, from the planning structure. The other two sequences Seq1 and Seq2, however, are indicated to be planning relevant. As seen from FIG. 15A, two planning modes are created for the planning operation. The first planning mode 1 consists of the sequence Op1, Op2, Op3 and Op8, and the second planning mode 2 consists of the sequence Op1, Op4, Op5 and Op8.

Thus it can be seen that the planning modes are each complete alternative sequences, where the entire sequence is an alternative. This is done because it is desirable to have one structure for the planning routing. All of the alternatives must be part of the operation. In addition, parts of the structure that are not part of the alternative are brought into the alternative. In other words, a sequence with an alternative sequence within it is transformed into alternative sequences. One mode is one alternative. Each mode describes one way to go through all of the operations that are part of the grouping. Each mode has all of the operations that are part of the grouping. All of the operations that are not alternatives are included in each mode.

It is not necessary that the planning operation markers be directly at the start and the end of an alternative branching. If there are some operations between the planning markers that are placed outside of the alternative branching, then the defined capacity requirements and times of these operations will be assigned to all modes also, as will be more fully appreciated later.

Figure 15B:
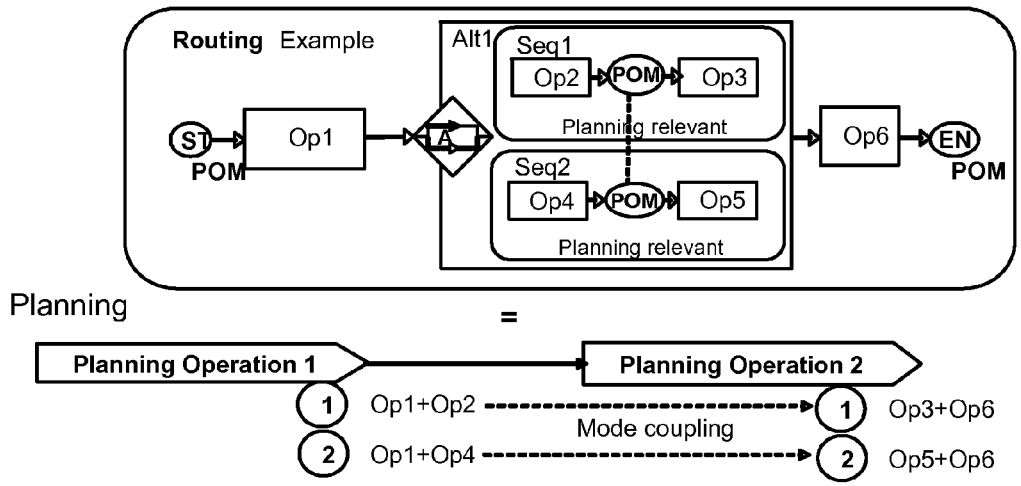

Turning next to step 1455 in the transformation process for alternative type planning operations, if one maintains alternative sequences in an alternative junction and each sequence contains at least one marker within the sequence, as in the routing shown in FIG. 15B, then every step from planning marker to planning marker is modelled as a planning operation in the planning view, with the number of modes equal to the number of planning relevant execution alternatives. In addition, all generated planning operations are coupled by a mode coupling.

FIG. 15B shows an example routing 1520 that has an alternative branching Alt 1 with two alternative sequences Seq1 and Seq2. Before and after the alternative branching are additional operations, with operation Op 1 before the alternative branching and operation Op6 after. Each alternative sequence Seq1 and Seq2 has a planning marker between the two operations that make up the sequence. In sequence Seq1, there is a marker between operation Op2 and operation Op3, and in sequence Seq2, there is a planning marker between operation Op4 and operation Op5. A first planning operation 1 is defined by start marker ST and the two internal planning markers POM, and a second planning operation 2 is defined by the two internal planning markers POM and the end marker EN. As seen from FIG. 15B, each of the two planning operations has two modes, and each mode is coupled to a corresponding mode in the other operation. Planning operation 1 has two modes, the first consisting of Op1 and Op2, and the second consisting of Op1 and Op4. Planning operation 2 also has two modes, the first consisting of Op3 and Op6, and the second consisting of Op5 and Op6. The first mode of operation 1 is coupled to the first mode of operation 2, and similarly, the second mode of operation 1 is coupled to the second mode of operation 2.

In some implementations intended to simplify the structure of the planning operation, mode coupling may work only if every alternative sequence of an alternative junction has the same number of planning operation marks and each operation does not have main resource assignments with different planning resources, as is the case in the FIG. 15B routing. If there is a reason for a special alternative sequence not to fulfill this requirement, then it is possible to define the mode as not planning relevant and it will not appear in the planning view as its own mode.

2.b. Planning Operations with Parallel Branchings:

For parallel type planning operations, at step 1465, a parallel structure is created for the planning operation. What this means is that all of the operations within a grouping and that are planning relevant are included in the execution operation, with any parallel execution branchings aggregated into a single step. For example, referring to routing 1540 shown in FIG. 15C, the routing 1540 includes, in sequence, a first simple execution operation Op 1, a parallel branching element Par 1, and another operation Op2. The parallel branching element contains two parallel sequences Seq1 and Seq2. Start marker S and end marker E define a single grouping that includes all of the three elements of the sequence. The planning operation structure created from this routing has a single mode, which consists of operation Op1, an aggregation of sequences Seq1 and Seq2, and operation Op2.

The indication of MAX(SeqI, Seq1) means that for planning purposes, the maximum time duration parallel path is used in the planning process, as will be described later. In addition, the sequence that is relevant for planning purposes may depend on the lot size of the production order. For example, for a given production process, the first parallel sequence Seq1 may take longer than the second parallel sequence Seq2 for small lot sizes, whereas for large lot sizes the opposite may be true. This may be the case, for example, because one sequence has a much longer set up time, but runs faster once set up.

Figure 15C:
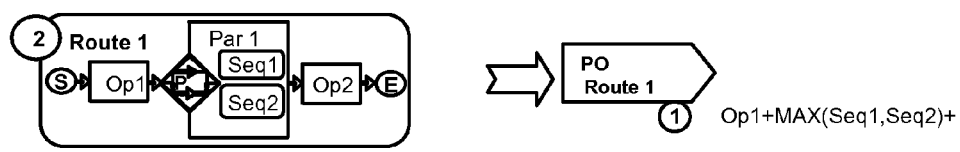

If planning markers are defined only outside of a parallel junction, then only one planning operation will be established for the parallel junction with only one planning mode. This mode takes in the maximum of the aggregated lead time of all parallels and accumulates all capacity requirements of all parallels. This behaviour is depicted in FIG. 15C. If there are some operations between the planning operation marks which are placed outside of the parallel junction, then the capacity requirements and times of these operations are assigned to this mode additionally.

If many parallel junctions are defined in a row without any planning operation marks between them, then the above mentioned procedures will be processed for all these parallel junctions. After this, lead time is set to the sum of all lead times of the different parallel junctions, and all capacity requirements are gathered to one mode.

If parallel sequences are desired to be visible in planning, then planning markers, in one implementation, are set directly in front of the parallel junction and at the end of each parallel sequences. With this rule, a multiple appearance of one special capacity requirement in different planning sequences can be avoided. If parallel sequences are maintained then every parallel sequence is represented by a planning operation with a mode which defines its own lead time and which collects all the capacities of the parallel sequence. Parallel planning operations are connected with parallel constraints in the planning view. This case is shown in FIG. 15C. In one implementation, it is not allowed to define planning markers at the start of parallel sequences. In addition, it is not allowed to define a planning marker directly behind a parallel junction if a planning marker is already set in one of the parallel sequences. If some of these rules are not considered by user, invalid markers may not be considered during planning view generation and parallels will be assumed as one single planning operation like in the above mentioned standard case, or as described previously, markers may be added.

Calculation of Aggregated Data

A description will now be provided of step 940 of the FIG. 9 method, or in other words, how aggregated time duration requirements and capacity requirements (planning data) may be determined during a rough-cut operation performed as part of the planning process.

In principle, there will be one primary capacity requirement for a main resource for every operation. However, if a main resource is used multiply on an alternative path, there will be only one primary capacity requirement for this main resource carrying all of the execution capacity requirements for this resource. Capacity requirements coming from additional resources may be modeled by additional secondary capacity requirements.

Alternatives (i.e. alternative paths or resource alternatives at operations) create different alternatives of planning operations or capacity requirements, or alternatively can be aggregated into the same alternative. For every main resource used in the alternative, the corresponding planning resource is determined and collected into the set of planning resources used at the alternative. If a main resource is not planning relevant, a planning resource is not collected for it.

If the sets of planning resources used at two alternatives are equal, the alternatives are aggregated into the same alternative of the planning operation. Otherwise, two alternatives are created. The capacity requirements are coupled with the corresponding alternative of the planning operation by its alternative number.

In determining capacity requirements as part of a planning operation, there may be one sub-activity defined for every planning resource used in an aggregated planning operation. For example, referring to FIG. 5, the first rough-cut capacity requirement RCCR1 of rough-cut operation 502 may be associated with an activity that uses a first resource, the second rough-cut capacity requirement RCCR2 may be associated with an activity that uses another resource that is different from the first resource, and the third rough-cut capacity requirement RCCR3 may be associated with an activity that uses yet another different resource. Where there are alternative paths (or resource alternatives at operation), the following rules may be used. First, the largest set of planning resources used in a path may define the number of sub-activities. Second, every sub-activity may get as many modes as a corresponding planning operation. Third, the modes of a sub-activity may be coupled by a mode number to the corresponding mode of the planning operation.

In one implementation, only sub-activities have capacity requirements associated with them, whereas operations may be considered only for scheduling or in other words, determining time duration requirements. In addition, every mode of a sub-activity may have at most one capacity requirement. This capacity requirement may aggregate all of the capacity that is need by the resource during the mode of the planning operation, even if the resource is used in different operations.

In some cases, a capacity height may be stored in a planning data structure, so that capacity height may be multiplied with a duration measure for a sub-activity to determine a capacity requirement. A capacity height may be considered possible only in the following narrow circumstances. First, a capacity height is possible if all of the aggregated capacity heights are equal, which would typically only be true if there is only one sub-activity or if all execution resources are the same. Second, a capacity height is possible where there either is no fixed part or is no variable part of the capacity height, in which case the capacity height can be calculated as a weighted mean of all capacity heights. Where a capacity height is not possible, two alternative solutions may be used as approximations in an aggregation. The first solution is to ignore a fixed part of capacity height, and calculate capacity height as a weighted mean of capacity heights of variable parts. Another solution is to store a capacity requirement as a linear function and calculate capacity height dynamically by dividing the capacity requirement by the duration of the sub-activity.

1. Duration Calculations:

Next, the duration of a planning operation for scheduling that is calculated in a rough-cut operation will be described. Generally, duration may be a linear function of an order quantity (for example, as set forth in the demand information 106 provided to the manufacturing planning module 108 in the FIG. 1 system). A general rule is that the time duration equals an execution time plus a buffer time, where the execution time is a linear function and the buffer time is fixed.

Execution time, as a general rule, may be calculated from activity durations only. Activities may have, for example, both fixed and variable durations associated with them. Execution time generally is most largely influenced by activities that are part of a material flow. This is because most setup and teardown activities may be performed in parallel with the material flow. An analytical approach to determining execution time may include appropriate simplifications, which will be described in more detail later.

Buffer time may be maintained at a resource and always be fixed, or that is, not dependent upon order quantity. In other words, the buffer time may be stored in memory in association with master data for the resource. The buffer time may equal, for example, a sum of buffer times of the main resources of all operations of a defined aggregated planning operation. The buffer time may be considered to be part of the material flow for purposes of determining the time duration.

Altogether, we get the following formula for the duration D(n) of a planning operation, if a sequence of operations containing at least one activity with a proper linear (i.e., non-constant) function is aggregated:

$$D(n) = F + \sum_{i=2}^{m} f_i + n \sum_{i=1}^{p} v_i + t_m,$$

where m is the number of execution operations.

p is the number of activities with variable durations that are part of the material flow (called production activities).

$v_i$ (i=1 ... p) is the variable duration of production activity i. It is normalized for 1 unit of the master output of the production model. (Note that a quantity conversion is necessary, if the UOM is the same, but the reference quantity of the operation differs from the reference quantity of the production model's master output).

$f_i$ is the fix duration of operation i that is part of the material flow (called buffer time of operation i). It contains the buffer time maintained at the main resource of operation i, fixed durations of the production activities of operation i, and the transition time maintained at operation i−1 if operation i is not the first operation that is aggregated into a planned operation (note that the transition time of the last operation that is aggregated into a planned operation is aggregated into the sequence relation(s) between the planning operation and its successor(s)).

$s_i$ is the duration of all activities of operation i that take place before the first production activity of operation i and is assumed as fix (called setup time).

$t_i$ is the duration of all activities of operation i that takes place after the last production activity of operation i and is assumed as fix (called teardown time)

$F:=\max(s_1,f_1)$, if the planning operation has a predecessor (whose last variable duration is denoted by v) and $v_1 \geq v$ and $F:=s_1+f_1$ otherwise Accordingly, the following simplifying assumptions may be made in determining the time duration for an aggregated planning activity: First, only the first setup and last teardown activity may be taken into account. Second, in a case of parallel paths (with durations of, respectively, an+b and cn+d), where n is the number of units in the order, where there is an aggregation of the two parallel paths, the time duration may be n×max(a,c)+max(b,d).

If step functions are used at all activities with variable duration, the duration function of the planning operation will be a step function also. The quantity increments are converted using an appropriate conversion factor. The quantity increment r of the planning operation is defined as the minimum quantity increment of all normalized quantity increments occurring at activities that are to be aggregated into the planning operation. Altogether, we get the following duration function:

$$D(n) = F + \sum_{i=2}^{m} f_i + \lceil n/r \rceil \sum_{i=1}^{p} v_i + t_m,$$

where the $v_i$ are normalized with respect to r.

When aggregating a sequence of activities with send-ahead quantities between all production activities, it may be assumed that the sequence of variable activity durations is concave, i.e., first increasing and then decreasing. If it is not, then the following formula calculates a duration that is too short. If the whole lot is passed from one production activity to another, the activity sequence can be split into two sub sequences whose duration functions can be added. The duration function for a concave (sub) sequence with send-ahead quantities is given by:

$$D(n) = F + \sum_{i=2}^{m} f_i + nv_a + \sum_{i \neq a: v_i \geq v_{i-1}} n_i v_i + \sum_{i: v_i < v_{i-1}} n_{i-1} v_i + t_m,$$

where a is the largest i with $v_i = \max(v_1, \ldots, v_p)$ $n_i$ is the send-ahead quantity of activity i (i.e. the quantity passed from activity i to activity i+1) if i<p and $n_p:=1$ If send-ahead quantities come together with quantity increments, this give (the $v_i$ are normalized with respect to $r_i$):

$$D(n) = F + \sum_{i=2}^{m} f_i + \lceil n/r_a \rceil v_a + \sum_{i \neq a: v_i \geq v_{i-1}} \lceil n_i/r_i \rceil v_i + \sum_{i: v_i < v_{i-1}} \lceil n_{i-1}/r_i \rceil v_i + t_m,$$

Mixed cases may be straightforward, but cumbersome to denote.

If parallel paths are to be aggregated into the same planning operation, the above-mentioned linear function is calculated for every path. If for two parallel paths the linear duration functions are $a_1n+b_1$ and $a_2n+b_2$, the resulting duration function for both paths is defined by $\max(a_1,a_2)n+\max(b_1,b_2)$. For step functions $\lceil n/r_1 \rceil a_1+b_1$, $\lceil n/r_2 \rceil a_2+b_2$ the resulting duration function is $\lceil n/r \rceil a+\max(b_1,b_2)$, where $a:=a_1$ and $r:=r_i$ with i chosen such that $a_i/r_i$ is maximal. If $a_1/r_1=a_2/r_2$, we choose $a:=\max(a_1,a_2)$ and $r:=\max(r_1,r_2)$. In a mixed scenario with $a_1n+b_1$ and $\lceil n/r_2 \rceil a_2+b_2$, we compare $a_1$ and $a_2/r_2$. Their maximum defines if we get a linear or a step function.

If alternatives (i.e. alternative paths or operations with resource alternatives) are aggregated into different modes then the above-mentioned rules are valid for every mode. If alternatives are aggregated into the same mode, the arithmetic mean of the durations of the single alternatives is taken. If at least one alternative has a linear function, the aggregated mode gets a linear function, too. If all alternatives that are aggregated have step functions, the aggregated mode gets a step function with the minimum quantity increment.

If a supply line flows in at a beginning of a defined planning operation, the situation discussed above for sequential planning operations may apply. If, however, a supply line S flows into a defined planning operation P at a point that is not the beginning of the planning operation, then an "end-end" constraint may be defined with a minimum offset. This minimum offset may be determined to be the length of a portion of the planning operation P after the supply line S flows in (including a buffer offset of the first common operation) minus the overlap between S and P. It may be noted that parallel paths may not need additional constraints, and may be modeled by simple sequence relations.

In view of the above discussion, a duration requirement of a rough-cut operation may be modeled as a simple function (for example, a linear function, a step function, etc.), which may be easy for a user to understand and hence believe in its accuracy. The simple function may be computed from execution times and buffer times of the rough-cut operations. In some embodiments, the manufacturing planning module 108 (FIGS. 1A and 1B) may simplify the calculation of the duration requirement of a production order by ignoring overlapping activities that are not part of the material flow, such as setup or tear down activities, because these operations may be done parallel with the material flow.

Figure 16A:
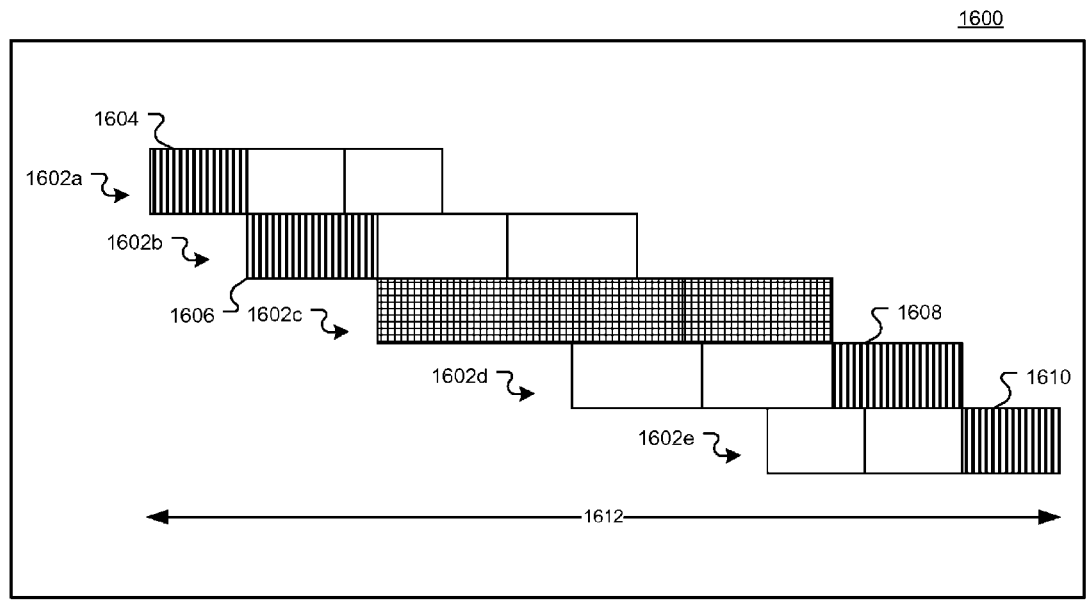
FIGS. 16A-B are graphs illustrating the merits of a planning operation duration calculation method, showing the simplification in aggregating duration requirement in a sequence of operations.
Figure 16B:
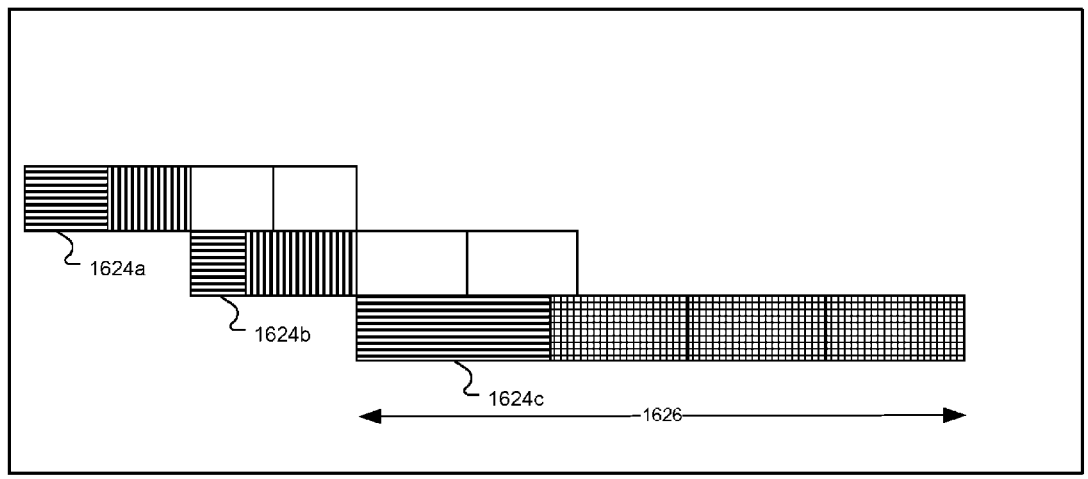

The simplifications for the duration requirement for scheduling purposes may be appreciated by referring to FIGS. 16A and 16B, which show how sequential operations of a manufacturing process may have portions that overlap with one another. By studying several common scenarios for manufacturing processes similar to those shown in FIGS. 16A and 16B, the above-described simplifications to the duration calculations for rough-cut planning operations may be determined. FIG. 16A shows an exemplary duration requirement graph 1600 that illustrates execution activities, or operations, that may be included in a rough-cut planning operation. A horizontal scale 1612 represents time. The graph 1600 includes five rows 1602a, 1602b, 1602c, 1602d, 1602e. Each row represents one execution activity. As discussed previously, each of the execution activities may be defined such that they use a different main resource.

The boxes in FIGS. 16A and 16B with some type of shading illustrate time that is included in an approximated rough-cut time duration calculation. In particular, boxes with vertical-lined shading represent a fixed portion of a variable activity duration, boxes with checked shading represent a variable portion of a variable activity duration, and boxes with horizontal line shading represent a buffer time associated with the main resource for the activity. The non-shaded boxes represent variable activity durations that do not have an influence on the duration of the rough-cut operation.

Referring to FIG. 16A, box 1604 may represent both a setup duration for the first activity of row 1602a and a duration required for the first activity 1602a to produce one send-ahead quantity that is to be used by the second activity of row 1602b. Box 1606 shown at the beginning of the second activity 1602b represents a duration required for the second activity to produce one send-ahead quantity to be used by the third activity of row 1602c. The third activity 1602c has the longest variable operation duration of any of the five activities included in the rough-cut planning operation. It was determined by experimentation of many example manufacturing processes similar to those depicted in FIGS. 16A and 16B that an accurate approximation for a rough-cut planning time duration calculation may be made by including all of the longest variable operation time of any of the activities included in the rough-cut operation. As such, the entirety of this third activity 1602c is included in the rough-cut duration time calculation, and FIG. 16 shows each of the blocks of the third activity of row 1602c with checked shading. Box 1608 shown at the end of the fourth activity 1602d represents a duration time required for the fourth activity to produce one send-ahead quantity (the final send-ahead quantity) to be used by the fifth activity of row 1602e. Box 1610 shown at the end of the fifth activity 1602e represents a duration required for the fifth activity 1602e to produce one send-ahead quantity (again, the final send-ahead quantity) to either the first activity included in the following rough-cut planning operation, or to the end of the overall process. Thus it can be seen that the five activities take place with overlapping times, but the time measures included in an approximated rough-cut planning operation time duration calculation do not include overlapping times.

Referring to FIG. 16B, buffer times shown as blocks 1624a, 1624b and 1624c associated with the main resources for each of the three activities included in the rough-cut operation are included. Following the buffer time 1624a for the first activity, there is block with vertical line shading that represents a setup time for the activity plus a duration required for the first activity to produce one send-ahead quantity that is to be used by the second activity. Following the buffer time 1624b for the second activity, there is again a block with vertical line shading that represents a duration required for the second activity to produce one send-ahead quantity that is to be used by the third activity. In the FIG. 16B example, the third and final activity is the one that has the longest variable operation time of any of the activities included in the rough-cut operation. As such, after the buffer time 1624c, the entirety of this third activity 1602c is included in the rough-cut duration time calculation.

Figure 17:
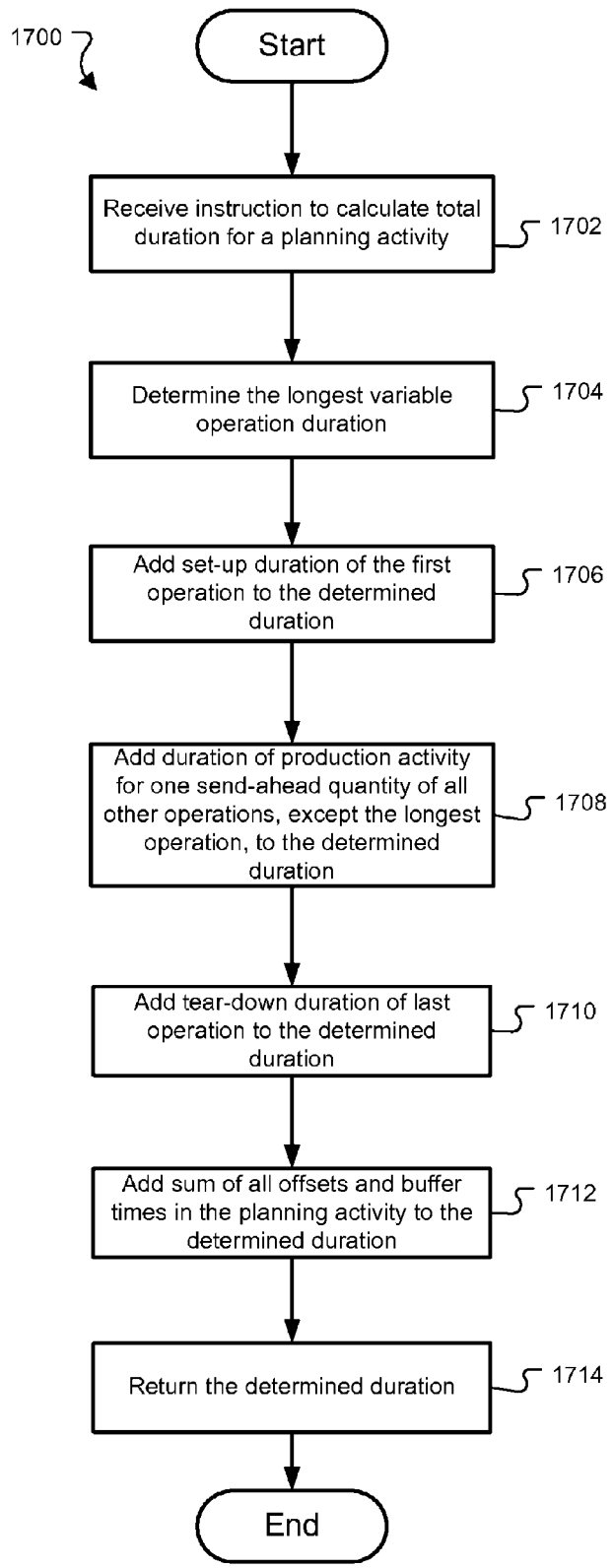
FIG. 17 is a flow chart showing exemplary steps for duration aggregation.

Referring now to FIG. 17, a flow chart is shown that depicts an exemplary method 1700 for generating a total duration of a planning activity. The planning activity may include multiple rough-cut operations with different operation attributes, such as variable operation durations. For example, a planning system, such as the manufacturing planning system 100, may be executing the step 412, in which the system may be creating master data by aggregating operation attributes and routing structures. Depending on multiple factors, such as the branching structures and other elements in the production order, the planning system may retrieve rules to aggregate duration requirement information in the production order to obtain a time duration measure value for a routing of the production order. The flow chart begins with the method 1700 receiving instructions to calculate total duration for a planning activity in step 1702.

Next, the method 1700 may, in step 1704, determine the longest variable operation duration. For example, the method 1700 may also use predefined rules to determine the duration requirement of each rough-cut operation and the method 1700 may calculate the longest variable operation duration by multiplying the lot size with the largest capacity height among all rough-cut operations. In step 1706, the method 1700 may add set-up duration of the first operation to the determined duration. After the set-up duration of the first operation is added, method 1700 may add one send ahead quantity of all other operations, except the longest, operation to the determined duration in step 1708. In step, 1710, the method 1700 may add tear-down duration of last operation to the determined duration. Then, in step 1712, the method 1700 may add the sum of all offsets and buffer times in the planning activity to the determined duration. The method may, in step 1714, return the determined duration when the computation in step 1712 ends.

2. Component Assignments:

Components are assigned to the planning operations. Component offsets are calculated as earliest possible requirement dates and stored as a linear function in the output quantity. The calculation is done as for the duration of the planning operations, but the resource buffers are ignored. If a component is assigned to different planning operations on different alternative paths, it is assigned to the earlier one. If a component has different offsets for different modes of a planning operation, the minimum offset is taken.

3. Durations of Capacity Requirements:

The duration functions of capacity requirements can be calculated using the same rules that are used for the duration functions of the planning operations (the calculation will be of course much simpler in most cases). The only difference is that only times coming from the PBoO are used, but no buffer times coming from the resources.

The capacity requirements will have offsets (probably modeled as constraints in the planned order) that carry the earliest start date and the latest end date of the planning operation (like the component offsets they are calculated from the BoO data i.e. we do not add the resource buffers). Note that there will be no constraints between the sub activities. If a sub activity has modes leading to different offsets, the minimum offset is used.

4. Offsets Between Planning Operations:

Subsequent planning operations A and B are connected by an end-start relation with minimum offset:

$x_m \cdot (G + t_m + S)$, where $G := \max(s_1 - f_1, 0)$, if the whole lot is passed or $w_1 \geq v_m$ and
$G := s_1$ otherwise $S := 0$ if the whole lot is passed and n $\min(v_m, w_1) - q \min(v_m, w_1)$ otherwise $v_m$ and $w_1$ are the variable durations of the last production activity of A and the first production activity of B, respectively $s_1$ and $f_1$ are the setup and buffer times of the first operation of B $t_m$ is the teardown time of the last operation of A $x_m$ is the transition time of the last operation of A k is the send-ahead quantity from the last operation of A to the first operation of B q:=k if there is no quantity increment at the last operation of A and q:⌈k/r⌉ if r is the quantity increment of the last operation of A If a planning operation A ends at the end of a supply line that flows into a planning operation B, we connect A and B by an end-end relation with minimum offset L−($t_m$+S), where L is the duration of B after A flows in (including buffer of first common operation)

$t_m$ and S are defined as above.

5. Capacity Requirements:

Planning operations will not carry capacity requirements. Every mode of a sub activity will carry at most one primary capacity requirement. Such a mode will collect all the capacity that is needed on this resource during this (alternative of the) planning operation (even if the same main resource is used twice during an alternative of a planning operation). In addition, the mode will carry capacity requirements for all additional resources that are used together with the main resource.

Normally, we can directly calculate the capacity height that is needed by an optimization system. This works in the following cases:

All capacity requirements for one planning resource have the same capacity height (trivially true, if there is only one activity using the resource or the execution resources are single resources)=>capacity requirement can directly be copied The duration function of the sub activity has no fixed part or no variable part=>the capacity height can be calculated as average of the capacity heights weighted with the durations In the general case, it is not possible to store a capacity height. In this case, we can calculate the capacity requirement as a linear function and calculate the capacity height by dividing the capacity requirement by the duration of the sub activity.

Figure 18:
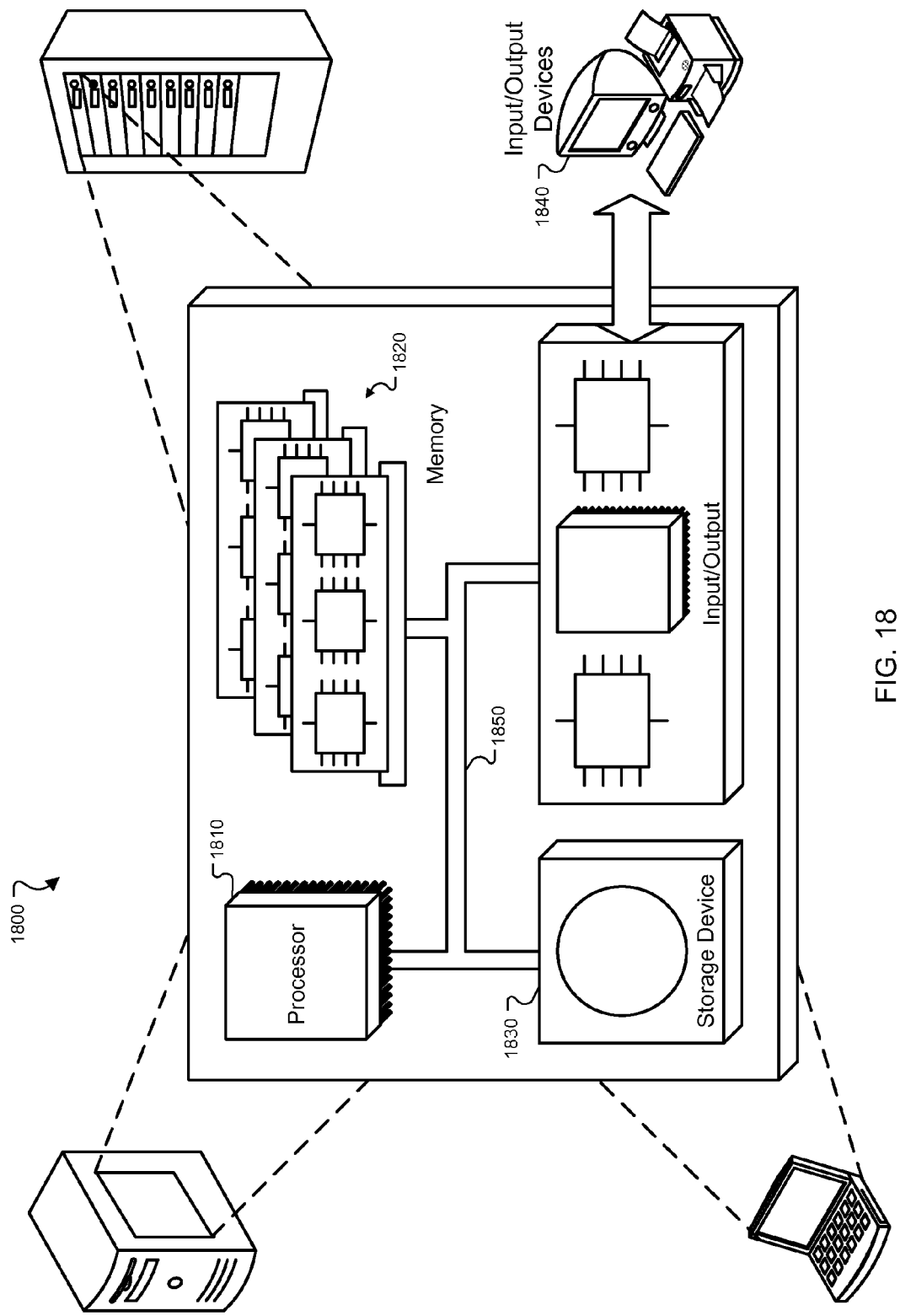
FIG. 18 is a block diagram of a computing system that can be used in connection with the data models and computer-implemented methods described in this document.

FIG. 18 is a schematic diagram of a generic computer system 1800. The system 1800 can be used for the operations described in association with any of the computer-implement methods described previously, according to one implementation. The system 1800 includes a processor 1810, a memory 1820, a storage device 1830, and an input/output device 1840. Each of the components 1810, 1820, 1830, and 1840 are interconnected using a system bus 1850. The processor 1810 is capable of processing instructions for execution within the system 1800. In one implementation, the processor 1810 is a single-threaded processor. In another implementation, the processor 1810 is a multi-threaded processor. The processor 1810 is capable of processing instructions stored in the memory 1820 or on the storage device 1830 to display graphical information for a user interface on the input/output device 1840.

The memory 1820 stores information within the system 1800. In one implementation, the memory 1820 is a computer-readable medium. In one implementation, the memory 1820 is a volatile memory unit. In another implementation, the memory 1820 is a non-volatile memory unit.

The storage device 1830 is capable of providing mass storage for the system 1800. In one implementation, the storage device 1830 is a computer-readable medium. In various different implementations, the storage device 1830 may be a floppy disk device, a hard disk device, an optical disk device, or a tape device.

The input/output device 1840 provides input/output operations for the system 1800. In one implementation, the input/output device 1840 includes a keyboard and/or pointing device. In another implementation, the input/output device 1840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EFPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for generating electronic data for use in planning an execution of a manufacturing process, the computer-implemented method comprising:
   receiving user defined groupings for multiple execution-level manufacturing operations that are defined in a manufacturing process execution-level electronic data model and that define a process flow to produce a product, the defined groupings forming respective rough-cut operations, wherein at least one of the defined groupings includes a process step definition that has multiple different defined alternative steps;
   generating and storing in memory the electronic data for use in planning execution of the manufacturing process using the defined groupings for the multiple execution-level manufacturing operations, wherein the generated electronic data includes, for each rough-cut operation that includes a process step definition that has multiple different defined alternative steps, at least first and second planning modes each comprising a sequence of operations, the first planning mode including at least one of the multiple alternative steps and the second planning mode including at least another of the multiple alternative steps, wherein each of the planning modes includes at least one first execution-level operation that is common to all of the planning modes and is not included in the process step definition that has the multiple different defined alternative steps, and at least one second execution-level operation that is different from any operations in each of at least one other planning mode and is included in the process step definition that has the multiple different defined alternative steps, each of the rough-cut operations having at least one rough-cut capacity requirement corresponding to a resource requirement;
   obtaining, from planning-level data, parameters that specify the resource requirements for the rough-cut capacity requirements; and
   using the generated electronic data stored in memory, including the rough-cut capacity requirements as specified by the parameters, in time duration calculations for the planning of the manufacturing process.

2. The method of claim 1 wherein the generated electronic data defines planning-level manufacturing operations that each correspond to a different one of the defined groupings of the execution-level operations.

3. The method of claim 1, further comprising omitting one of the multiple different defined alternative steps from the electronic data generation after identifying that it is not relevant to planning the execution of the manufacturing process.

4. The method of claim 1, wherein a separate planning mode is generated to correspond to each of the multiple different defined alternative steps.

5. A computer-implemented method for generating electronic data for use in planning an execution of a manufacturing process, the computer-implemented method comprising:
   receiving user defined groupings for multiple execution-level manufacturing operations that are defined in a manufacturing process execution-level electronic data model and that define a process flow to produce a product, the defined groupings forming respective rough-cut operations, wherein at least one of the defined groupings includes a process step definition that has multiple different defined parallel paths;
   generating and storing in memory the electronic data for use in planning the execution of the manufacturing process using the defined groupings for the multiple execution-level manufacturing operations, wherein the generated electronic data includes, for each rough-cut operation that includes a process step definition that has multiple different defined parallel paths, a duration calculation formula for the grouping based on an input lot size for the product being produced and that produces a duration measure that corresponds to a longest path duration for the multiple different defined parallel paths for the input lot size, each of the rough-cut operations having at least one rough-cut capacity requirement corresponding to a resource requirement; and
   obtaining, from planning-level data, parameters that specify the resource requirements for the rough-cut capacity requirements; and
   wherein for a first input lot size the longest path duration corresponds to a first parallel path of the multiple parallel paths, and wherein for a second input lot size the longest path duration corresponds to a second parallel path of the multiple different defined parallel paths, the second parallel path different from the first parallel path.

6. The method of claim 5 wherein the generated electronic data defines planning-level manufacturing operations that each correspond to a different one of the defined groupings of the execution-level operations.

7. A computer program product embodied in a computer-readable storage device and comprising executable instructions that, when executed, perform operations for generating electronic data for use in planning an execution of a manufacturing process, the operations comprising:
   receiving user defined groupings for multiple execution-level manufacturing operations that are defined in a manufacturing process execution-level electronic data model and that define a process flow to produce a product, the defined groupings forming respective rough-cut operations, wherein at least one of the defined groupings includes a process step definition that has multiple different defined alternative steps;
   generating and storing in memory the electronic data for use in planning execution of the manufacturing process using the defined groupings for the multiple execution-level manufacturing operations, wherein the generated electronic data includes, for each rough-cut operation that includes a process step definition that has multiple different defined alternative steps, at least first and second planning modes each comprising a sequence of operations, the first planning mode including at least one of the multiple alternative steps and the second planning mode including at least another of the multiple alternative steps, wherein each of the planning modes includes at least one first execution-level operation that is common to all of the planning modes and is not included in the process step definition that has the multiple different defined alternative steps, and at least one second execution-level operation that is different from any operations in each of at least one other planning mode and is included in the process step definition that has the multiple different defined alternative steps, each of the rough-cut operations having at least one rough-cut capacity requirement corresponding to a resource requirement;

obtaining, from planning-level data, parameters that specify the resource requirements for the rough-cut capacity requirements; and using the generated electronic data stored in memory, including the rough-cut capacity requirements as specified by the parameters, in time duration calculations for the planning of the manufacturing process.

8. The computer program product of claim 7 wherein the generated electronic data defines planning-level manufacturing operations that each correspond to a different one of the defined groupings of the execution-level operations.

9. The computer program product of claim 7, further comprising instructions that when executed perform operations comprising omitting one of the multiple different defined alternative steps from the electronic data generation after identifying that it is not relevant to planning the execution of the manufacturing process.

10. The computer program product of claim 7, wherein a separate planning mode is generated to correspond to each of the multiple different defined alternative steps.

* * * * *